United States Patent
Landman

(10) Patent No.: US 10,972,289 B2
(45) Date of Patent: Apr. 6, 2021

(54) SOFTWARE RELEASE VERIFICATION

(71) Applicant: JFrog Ltd., Netanya (IL)

(72) Inventor: Yoav Landman, Netanya (IL)

(73) Assignee: JFrog, Ltd., Netanya (IL)

( * ) Notice: Subject to any disclaimer, the term of this patent is extended or adjusted under 35 U.S.C. 154(b) by 0 days.

(21) Appl. No.: 16/931,741

(22) Filed: Jul. 17, 2020

(65) Prior Publication Data
US 2021/0021428 A1 Jan. 21, 2021

Related U.S. Application Data

(60) Provisional application No. 62/876,560, filed on Jul. 19, 2019.

(51) Int. Cl.
| | |
|---|---|
| *G06Q 30/08* | (2012.01) |
| *G06Q 30/02* | (2012.01) |
| *H04L 9/32* | (2006.01) |
| *G06Q 20/32* | (2012.01) |
| *G06Q 20/36* | (2012.01) |
| *G06F 8/60* | (2018.01) |

(52) U.S. Cl.
CPC .............. *H04L 9/3247* (2013.01); *G06F 8/60* (2013.01)

(58) Field of Classification Search
CPC ..... G06F 8/65; G06F 8/71; G06F 8/60; G06F 8/61; G06F 21/51; G06F 21/10; G06F 16/9535; H04L 63/0823; H04L 63/10; H04L 63/123; H04L 9/3247; G06Q 30/02; G06Q 30/08; G06Q 30/0269; G06Q 30/0273
See application file for complete search history.

(56) References Cited

U.S. PATENT DOCUMENTS

| | | | |
|---|---|---|---|
| 5,671,282 A | 9/1997 | Wolff et al. | |
| 5,915,238 A | 6/1999 | Tjaden | |
| 5,931,946 A | 8/1999 | Terada et al. | |
| 6,604,236 B1 | 8/2003 | Draper et al. | |
| 7,007,042 B2 | 2/2006 | Lubbers et al. | |
| 9,280,339 B1 | 3/2016 | Prunicki et al. | |
| 9,659,155 B2 * | 5/2017 | Kosovan | G06F 21/121 |
| 9,842,062 B2 | 12/2017 | Ford et al. | |

(Continued)

OTHER PUBLICATIONS

Jana et al., Management of security and privacy issues of application development in mobile cloud environment: A survey, 6 pages (Year: 2014).*

(Continued)

*Primary Examiner* — Thuy Dao
(74) *Attorney, Agent, or Firm* — Norton Rose Fulbright US LLP

(57) ABSTRACT

The present disclosure provides a method, system, and device for verifying a software release. To illustrate, as software (e.g., one or more files or artifacts) completes one or more stages of a development process, one or more digital signatures are generated. The one or more digital signatures are generated using private keys that correspond to the stage of the development process that is completed. The one or more digital signatures, and one or more public keys corresponding to the private keys, are sent to a node device. Upon receipt of the one or more digital signatures and the public keys (e.g., as part of a software release), the node device verifies the digital signatures before processing the software.

29 Claims, 9 Drawing Sheets

(56) References Cited

U.S. PATENT DOCUMENTS

| | | |
|---|---|---|
| 10,409,838 B1 | 9/2019 | George et al. |
| 10,754,952 B2 | 8/2020 | Muller et al. |
| 2003/0220880 A1 | 11/2003 | Lao et al. |
| 2004/0250115 A1 | 12/2004 | Gemmel et al. |
| 2007/0294686 A1 | 12/2007 | Oh |
| 2009/0013317 A1 | 1/2009 | Abfalter et al. |
| 2009/0119655 A1 | 5/2009 | Quilty |
| 2011/0107419 A1 | 5/2011 | Vidal et al. |
| 2011/0113012 A1 | 5/2011 | Gruhl et al. |
| 2012/0131566 A1 | 5/2012 | Morgan et al. |
| 2012/0233134 A1 | 9/2012 | Barton et al. |
| 2012/0240096 A1 | 9/2012 | Sass |
| 2013/0081100 A1 | 3/2013 | Sreehari et al. |
| 2013/0132946 A1 | 5/2013 | Ma |
| 2014/0245376 A1 | 8/2014 | Hibbert et al. |
| 2015/0268881 A1 | 9/2015 | Nielsen et al. |
| 2015/0301823 A1 | 10/2015 | Hatakeyama |
| 2015/0302037 A1 | 10/2015 | Jackson et al. |
| 2016/0117235 A1 | 4/2016 | Mishra et al. |
| 2016/0124665 A1 | 5/2016 | Jain et al. |
| 2016/0179867 A1 | 6/2016 | Li et al. |
| 2016/0234237 A1 | 8/2016 | Thakar et al. |
| 2016/0267101 A1 | 9/2016 | Clissold et al. |
| 2017/0034023 A1 | 2/2017 | Nickolov et al. |
| 2017/0060546 A1 | 3/2017 | Prasad et al. |
| 2017/0147338 A1 | 5/2017 | Jackson et al. |
| 2017/0264588 A1 | 9/2017 | Hunt et al. |
| 2017/0300309 A1 | 10/2017 | Berger et al. |
| 2019/0050576 A1 | 2/2019 | Boulton |
| 2019/0080080 A1* | 3/2019 | Ogura .................... G06F 21/57 |
| 2019/0130114 A1 | 5/2019 | Smith et al. |
| 2019/0205121 A1 | 7/2019 | Ericson |
| 2019/0306173 A1 | 10/2019 | Reddy et al. |
| 2020/0012441 A1 | 1/2020 | Chheda et al. |
| 2020/0351089 A1* | 11/2020 | Wentz ................. G06Q 20/3827 |
| 2020/0372183 A1* | 11/2020 | Rangaiah .............. G06F 21/125 |

OTHER PUBLICATIONS

Patent Cooperation Treaty, International Search Report and Written Opinion issued for PCT Application No. PCT/IB2020/056777, dated Oct. 19, 2020, 15 pages.

Li et al. "A Quantitative and Comparative Study of Network-Level Efficiency for Cloud Storage Services," ACM Trans. Model. Perform. Eval. Comput. Syst., vol. 4, No. 1, Article 3, 2019, 32 pages.

\* cited by examiner

SOFTWARE RELEASE VERIFICATION

CROSS-REFERENCE TO RELATED APPLICATIONS

The present application claims the benefit of U.S. Provisional Application No. 62/876,560 filed Jul. 19, 2019, and entitled "SOFTWARE RELEASE VERIFICATION"; and is related to U.S. patent application Ser. No. 16/399,905 entitled "DATA BUNDLE GENERATION AND DEPLOYMENT," filed Apr. 30, 2019, U.S. patent application Ser. No. 16/399,938 entitled "DATA FILE PARTITION AND REPLICATION" filed Apr. 30, 2019, and to U.S. patent application Ser. No. 16/399,953 entitled "DATA FILE PARTITION AND REPLICATION" filed Apr. 30, 2019, the contents of which are incorporated by reference herein in their entirety.

TECHNICAL FIELD

The present application is generally related to the technical field of software deployment, and more particularly, but not by way of limitation, to techniques for verification of a software development process.

BACKGROUND

Computer systems and software have become an integral part of modern society and affect a variety of aspects of daily life. Software can be developed as a monolith, such as one piece of software, or as a service-oriented architecture where each piece of software provides a specific service and multiple pieces of software operate together. Software can be updated to add or remove functionality, to correct bugs (e.g., critical/functional issues), and/or to address security issues. To update a piece of software, a new version is developed and deployed to a device, such as a software consumable device that stores and executes the new version of the software.

As part of generating a software release, software (e.g., one or more files) may undergo one or more development stages of a development process. Some of these development stages include generating software builds and performing different types of tests on the builds. However, once the software release is finalized and deployed, there is no way to verify that the software release successfully completed each of the one or more development stages. For example, a malicious programmer may alter code after completion of one or more development stages. Executing unverified software can lead to problems, such as vulnerabilities in a computer system that executes the software.

BRIEF SUMMARY

Embodiments of the present disclosure provide systems, methods, and computer-readable storage media that provide for verifying completion of one or more stages of a development process for a software release. For example, a server (e.g., deployment system/application) may receive, from an entity device, an indication of one or more files for distribution as a software release and may receive one or more digital signatures from the entity device. Each digital signature of the one or more digital signatures corresponds to a development stage (of one or more development stages) of a software development process. To illustrate, upon completion of a particular development stage for one or more files (e.g., artifacts), a digital signature is generated by the entity device using a private key that corresponds to the particular development stage. In some implementations, the private key may be a one-time use private key. The particular digital signature and a public key that corresponds to the private key are provided from the entity device to the server. Other digital signatures are similarly generated and shared by other development stages (or by the same development stages for different files). The server may generate software release information that includes the indication of the one or more files and the one or more digital signatures, and the server may transmit the software release information to a node device as part of a deployment process. Additionally, the public keys may be provided to the node device (e.g., from the entity device or from the server). The node device may use the digital signatures and the public keys to confirm that the corresponding software release (e.g., the one or more files) has successfully completed the one or more development stages. Thus, improved security of software releases may be provided through the sharing of multiple digital signatures and public keys, which may reduce or eliminate execution of unverified software at the node device.

In some implementations, digital signature metadata (e.g., metadata corresponding to the particular digital signature) may be provided and/or generated along with the particular digital signature. The metadata corresponding to the particular digital signature may include data indicative of an author of the particular digital signature, a development stage corresponding to the particular digital signature, a time corresponding to generation of the particular digital signature, a build job number corresponding to the particular digital signature, a checksum corresponding to the particular digital signature, or any combination thereof. In such implementations, the server may generate software release information that includes the digital signature metadata. The digital signature metadata may enable a node device to quickly identify which public key corresponds to a particular digital signature during a verification process.

According to one embodiment, a method for sharing digital signature information of a software release is described. The method includes receiving file information corresponding to one or more files of a software release from an entity device. The method includes receiving multiple digital signatures from the entity device. Each digital signature corresponds to a development stage of multiple development stages of the software release. The method includes receiving node information corresponding to one or more node devices from the entity device. The method also includes generating software release information including the multiple digital signatures and an indication of the one or more files. The method further includes initiating transmission of the software release information to the one or more node devices.

According to yet another embodiment, a system for sharing digital signature information of a software release is described. The system includes at least one memory storing instructions and one or more processors coupled to the at least one memory. The one or more processors are configured to execute the instructions to cause the one or more processors to receive, from an entity device, file information corresponding to the one or more files of a software release. The one or more processors are configured to execute the instructions to cause the one or more processors to receive multiple digital signatures from the entity device. Each digital signature corresponds to a development stage of multiple development stages of the software release. The one or more processors are configured to execute the instructions to cause the one or more processors to receive node information corresponding to one or more node devices to receive the software release. The one or more processors are also configured to execute the instructions to cause the one or more processors to generate software release information including the multiple digital signatures and an indication of the one or more files. The one or more processors are further configured to execute the instructions to cause the one or more processors to initiate transmission of the software release information to the one or more node devices.

According to another embodiment, a computer program product is described that includes a computer-readable storage device, such as a non-transitory computer-readable storage medium, that includes instructions that, when executed by one or more processors, cause the one or more processors to perform operations for sharing digital information of a software release. The operations include executing a first routine to receive file information corresponding to one or more files of a software release from an entity device. The operations further include executing a second routine to receive multiple digital signatures from the entity device. Each digital signature corresponds to a development stage of multiple development stages of the software release. The operations also include executing a third routine to receive node information corresponding to one or more node devices from the entity device, executing a fourth routine to generate software release information including the multiple digital signatures and an indication of the one or more files, and executing a fifth routine to initiate transmission of the software release information to the one or more node devices.

According to another embodiment, a method for verification of a deployed software release is described. The method includes receiving software release information including an indication of one or more files and multiple digital signatures corresponding to different development stages of multiple development stages of a software release. The method includes receiving one or more public keys associated with one or more private keys used to generate the multiple digital signatures. The method includes identifying the one or more files based on the indication. The method includes verifying the multiple digital signatures based on the one or more public keys. The method further includes processing the one or more files based on verification of the multiple digital signatures.

According to yet another embodiment, a system for receiving a software release is described. The system includes at least one memory storing instructions and one or more processors coupled to the at least one memory. The one or more processors are configured to execute the instructions to cause the one or more processors to receive software information including an indication of one or more files and multiple digital signatures corresponding to different development stages of multiple development stages of a software release. The one or more processors are further configured to execute the instructions to cause the one or more processors to receive one or more public keys associated with the one or more private keys used to generate the multiple digital signatures. The one or more processors are also configured to execute the instructions to cause the one or more processors to identify the one or more files based on the indication. The one or more processors are also configured to execute the instructions to cause the one or more processors to verify the multiple digital signatures based on the one or more public keys. The one or more processors are further configured to execute the instructions to cause the one or more processors to process the one or more files based on verification of the multiple digital signatures.

According to another embodiment, a computer program product is described that includes a computer-readable storage device, such as a non-transitory computer-readable storage medium, that includes instructions that, when executed by one or more processors, cause the one or more processors to perform operations for verification of a deployed software release. The operations include executing a first routine to receive software release information including an indication of one or more files and multiple digital signatures corresponding to different development stages of multiple development stages of a software release. The operations include executing a second routine to receive one or more public keys associated with one or more private keys used to generate the multiple digital signatures. The operations further include executing a third routine to identify the one or more files based on the indication, and executing a fourth routine to verify the multiple digital signatures based on the one or more public keys. The operations also include executing a fifth routine to process the one or more files based on verification of the multiple digital signatures.

The foregoing has outlined rather broadly the features and technical advantages of the present disclosure in order that the detailed description of the invention that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which.

DETAILED DESCRIPTION OF THE INVENTION

Figure 1:
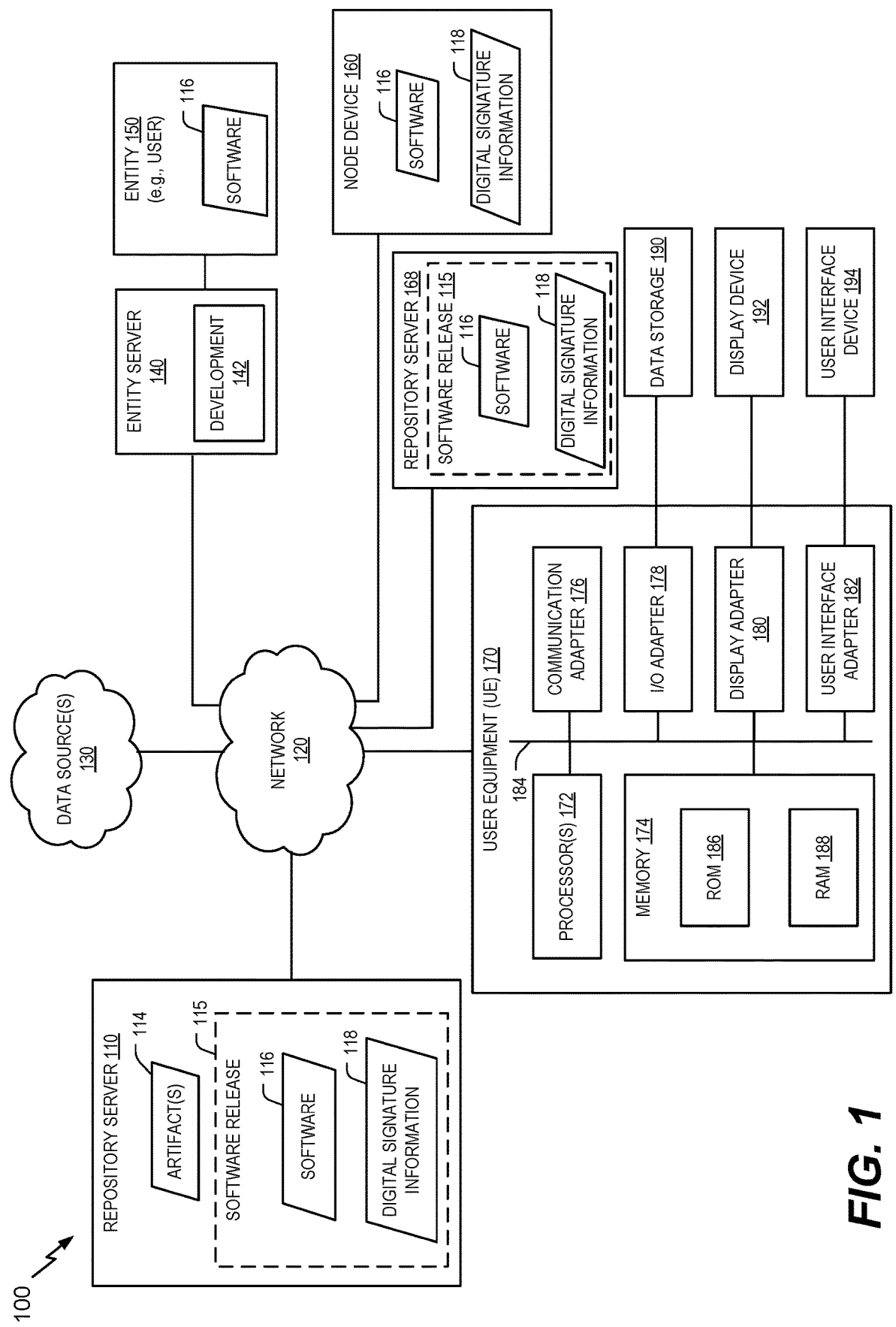
FIG. 1 is a block diagram of an example of a system that includes a server for sharing digital signature information of a software release.

Inventive concepts utilize a system to share digital signature information and to verify completion of a development process by a software release. To illustrate, a software release (e.g., one or more files or artifacts) may undergo a development process at an entity device. Upon completion of at least one development stage, a digital signature may be generated to indicate completion of the development stage. For example, a first digital signature may be generated based on the one or more files successfully completing a unit test, a second digital signature may be generated based on the one or more files successfully completing an integration test, a third digital signature may be generated on the one or more files successfully completing assembly, etc. Each digital signature may be generated based on a private key corresponding to the completed development stage (or a private key corresponding to a user who signs off on completion of the development stage). In some implementations, the private keys are one time use private keys. Each private key has a corresponding public key. Additionally, or alternative, digital signature metadata corresponding to the digital signatures, the private key, and/or the public key may be generated.

The digital signatures, digital signature metadata, and/or the public keys may be transmitted from the entity device to a server. The digital signature metadata may include information such as an author corresponding to the digital signature, a development stage corresponding to the digital signature, a time corresponding to the digital signature, a date corresponding to the digital signature, a build job number corresponding to the digital signature, a checksum corresponding to the digital signature, etc. The digital signatures (and digital signature metadata and public keys) may be sent in addition to sending of the one or more files (e.g., the software release) or file information indicating the one or more files to the server. The server may maintain a digital signature ledger that stores the digital signatures and the corresponding digital signature metadata.

Based on receiving the file information and the digital signatures, the server generates software release information. The software release information (e.g., release bundle information) includes the digital signatures, the digital signature metadata, and an indication of the one or more files. The server transmits the software release information to one or more node devices to enable the one or more node devices to verify that the software release (e.g., the one or more files) has successfully completed the multiple development stages of the development process. For example, the software release may be deployed, as described in U.S. patent application Ser. No. 16/399,905. In some implementations, only a portion of the files may be deployed to the one or more node devices. For example, files that are already stored at the one or more node devices may not be replicated and transmitted, in accordance with replication described in U.S. patent application Ser. No. 16/399,938 or U.S. patent application Ser. No. 16/399,953. In some implementations, the server also transmits the public keys to the one or more node devices. Alternatively, the entity device may transmit the public keys to the one or more node devices. Using the digital signatures and the public keys, the one or more node devices are able to verify whether the software release has successfully completed the multiple development stages.

To illustrate, a node device receives the software release information and the public keys. The node device may identify one or more files based on an indication of the one or more files in the software release information. Some or all of the one or more files may be stored at the node device. Additionally, some or all of the one or more files may be received from the server. The node device may verify that the one or more files have completed the multiple development stages based on the multiple digital signatures and the public keys. For example, the node device may use the public keys to decrypt the digital signature and verify that the digital signature is correct. Verifying each digital signature verifies that the one or more files successfully completed the corresponding development stage.

Based on verifying that the one or more files have completed the multiple development stages, the node device may process the one or more files. For example, the node device may transfer the one or more files from a transaction directory to another memory location for execution and setting a flag to indicate that the one or more files have completed the multiple development stages. If the node device is unable to verify that the one or more files have completed the multiple development stages, the node device may send a notification to the entity device and/or delete (or otherwise discard) the one or more files from the transaction directory. Thus, the node device may advantageously verify whether a software release has completed the multiple development stages of the development process before processing the software, thereby preventing the node device from processing unverified software, which may open the node device to vulnerabilities. Stated another way, the node device is able to verify that the same software that passed a development stage is the software that is received, and that the software has not been altered since the software passed the development stage.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may include a machine-or machines-executable instructions. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, include one or more physical or logical blocks of computer instructions that may be organized as an object, procedure, or function. Nevertheless, the executables of an identified module need not be physically located together, but may include disparate instructions stored in different locations that, when joined logically together, include the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Referring to FIG. 1, a block diagram of a system that includes a server for sharing digital signature information of a software release is shown and designated 100. System 100 includes a server 110 (e.g., a first repository server), a network 120, data sources 130, an entity server 140, an entity 150, a node device 160, a server 168 (e.g., a second repository server), and user equipment 170.

Server 110 may include one or more servers that, according to one implementation, are configured to perform several of the functions and/or operations described herein. One or more of the servers including server 110 may include memory, storage hardware, software residing thereon, and one or more processors configured to perform functions associated with system 100, as described further herein at least with reference to FIGS. 2 and 3. One of skill in the art will readily recognize that different server and computer architectures can be utilized to implement server 110, and that server 110 is not limited to a particular architecture so long as the hardware implementing server 110 supports the functions of the repository system disclosed herein. As shown in FIG. 1, user equipment can be used to enable an owner and/or administrator of repository server 110 to access and modify aspects (e.g., instructions, applications, data) of repository server 110. For example, components including user equipment 170, such as one or more processors 172, can be used to interface with and/or implement the server 110. Accordingly, user equipment 170 (e.g., a user station) may serve as a repository portal by which a user may access a repository system, such as a universal artifact repository, disclosed herein. For example, an artifact repository system may include server 110 (e.g., a first server) and server 168 (e.g., a second server). The portal can function to allow multiple users, inside and outside system 100 (e.g., at multiple instances of user equipment 170), to interface with one another. Additionally, it is noted that the one or more components described with reference to user equipment 170 may also be included in one or more of repository server 110, entity server 140, entity 150, node device 160, and/or server 168.

As shown, server 110 includes one or more artifacts 114 and software release 115. Artifacts may include one or more binaries (e.g., a computer file that is not a text file). The artifacts may correspond to one or more package types. For example, a first artifact may correspond to a first package type, such as Maven, and a second artifact may correspond to a second package type, such as Bower. Software release 115 may include software 116 (e.g., one or more of artifacts 114) and software release information that includes digital signature information 118. Digital signature information 118 may include one or more digital signatures and metadata corresponding to at least one of the one or more digital signatures. In some implementations, digital signature information 118 may include multiple digital signatures and metadata corresponding to at least one of the multiple digital signatures. Each digital signature may correspond to a development stage of multiple development stages of a development process of software 116. For example, as described further herein, software 116 may be generated by entity 150 and/or entity server 140 by undergoing multiple development stages. The multiple digital signatures may indicate successful completion of a corresponding development stage, and may be used by node device 160 to verify completion of the multiple development stages, as further described herein.

Network 120, such as a communication network, may facilitate communication of data between server 110 and other components, servers/processors, and/or devices. For example, network 120 may also facilitate communication of data between server 110 and one or more data sources 130, entity server 140, a node device 160, server 168, or any combination therefore. Network 120 may include a wired network, a wireless network, or a combination thereof. For example, network 120 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

Data sources 130 include the sources from which server 110 collects information. For example, data sources may include one or more reciprocities of artifacts, such as open source artifacts, vulnerability data, and/or license data, as illustrative, non-limiting examples.

Entity server 140 may include one or more servers which entity 150 uses to support its operations. In some implementations, entity server 140 may support a development process 142 that includes multiple development stages for generating software for a software release. In such implementations, entity 150 includes or is configured to generate (or initiate generation of) software 116 (e.g., one or more files). Software 116 includes one or more files (e.g., artifacts) to be included in a software release. For example, software 116 may correspond to a build job. In some implementations, after performance of development process 142, entity 150 provides software 116, or software information indicating the files included in software 116, to server 110. In other implementations, entity 150 provides a query and/or one or more parameters for a query which is performed by server 110 to generate the software information at server 110. To illustrate, entity 150 initiate a query by server 110 to identify one or more files corresponding to a particular build job identifier. The software information may be used to generate a software release, as further described herein.

Entity 150 may include any individual, organization, company, corporation, department (e.g., government), or group of individuals. For example, one entity may be a corporation with retail locations spread across multiple geographic regions (e.g., counties, states, or countries). As another example, another entity may be a corporation with cruise ships. As another example, another entity may be a group of one or more individuals. In a particular implementation, entity 150 includes a business and at least one user who can access server 110. For example, the user may access server 110 via an application, such as an application hosted by server 110. To illustrate, the user may have an account (e.g., on behalf of entity 150) and may log in to server 110 via the application. Although system 100 shows one entity 150, in other implementations, system 100 includes multiple entities. In a particular implementation, the multiple entities may include a first entity and a second entity, as described further herein at least with reference to FIG. 2. In such implementations, the first entity and the second entity may be the same entity (e.g., part of the same company) or may be different entities.

Node device 160 includes software 116 and software release information that includes digital signature information 118 (including one or more digital signatures). To illustrate, software (e.g., packages) hosted at node device 160 may be part of a software release which is a secure and immutable collection of software packages that make up a software release. Node device 160 also includes digital signature information 118, for use in verifying that software 116 has completed the multiple development stages of development process 142, as further described herein with reference to FIGS. 2 and 3.

In some implementations, node device 160 may include or correspond to entity 150. Although system 100 is shown as having one node device 160, in other implementations, the system 100 may include multiple node devices (e.g., 160). Node device 160 may include a data center, a point-of-sale, a mobile device, or an Internet of things (IoT) device. In some implementations, node device 160 includes a communications device, a fixed location data unit, a mobile location data unit, a mobile phone, a cellular phone, a satellite phone, a computer, a tablet, a portable computer, a display device, a media player, or a desktop computer. Alternatively, or additionally, node device 160 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle or a device integrated within a vehicle, any other device that includes a processor or that stores or retrieves data or computer instructions, or a combination thereof. In other illustrative, non-limiting examples, the system, the device, or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Server 168 may be a repository server and may include or correspond to server 110. In some implementations, server 110 and server 168 may be included in a universal artifact management system. Server 110 and server 168 may execute different environments while sharing artifacts 114. In some implementations, server 168 receives software release 115 (e.g., software 116 and software release information including digital signature information 118) and supplies software release 115 to node device 160.

With respect to user equipment 170, user equipment may include one or more processors 172, memory 174, a communication adapter 176, an input/output adapter 178, a display adapter 180, a user interface adapter 182, and a bus 184. As shown, each of one or more processors 172, such as a central processing unit (CPU), memory 174, communication adapter 176, input/output adapter 178, display adapter 180, and user interface adapter 182 are coupled to/via bus 184. As noted above, one or more components of user equipment 170 may also be included in one or more other devices, such as server 110, to enable and/or support operations and functionality at the other device.

One or more processors 172 may include a CPU or microprocessor, a graphics processing unit ("GPU"), and/or microcontroller that has been programmed to perform the functions of user equipment 170. Implementations described herein are not restricted by the architecture of the one or more processors 172 so long as the one or more processors 172, whether directly or indirectly, support the operations described herein. The one or more processors 172 may be one component or multiple components that may execute the various described logical instructions.

Memory 174 includes read only memory (ROM) 186 and random access memory (RAM) 188. ROM 186 may store configuration information for booting user equipment 170. ROM 186 can include programmable read-only memory (PROM), erasable programmable read-only memory (EPROM), electrically erasable programmable read-only memory (EEPROM), optical storage, or the like. User equipment 170 may utilize RAM 188 to store the various data structures used by a software application. RAM 188 can include synchronous RAM (SRAM), dynamic RAM (DRAM), synchronous dynamic RAM (SDRAM), or the like. ROM 186 and RAM 188 hold user and system data, and both ROM 186 and RAM 188 may be randomly accessed. In some implementations, memory 174 may store the instructions that, when executed by one or more processor 172, cause the one or more processors 172 to perform operations according to aspects of the present disclosure, as described herein.

Communications adapter 176 can be adapted to couple user equipment 170 to a network, which can be one or more of a LAN, WAN, and/or the Internet. Therefore, in some embodiments, server 110 may be accessed via an online portal. The I/O adapter 178 may couple user equipment 170 to one or more storage devices 190, such as one or more of a hard drive, a solid state storage device, a flash drive, a compact disc (CD) drive, a floppy disk drive, a tape drive, and/or the like. Also, data storage devices 190 can be a separate server coupled to user equipment 170 through a network connection to I/O adapter 178. Display adapter 180 can be driven by one or more processors 172 to control presentation via display device 192. In some implementations, display adapter 180 may display a graphical user interface (GUI) associated with a software or web-based application on display device 192, such as a monitor or touch screen. User interface adapter 182 couples user interface device 194, such as a keyboard, a pointing device, and/or a touch screen to the user equipment 170. The I/O adapter 178 and/or the user interface adapter 182 may, in certain embodiments, enable a user to interact with user equipment 170. Any of devices 172-184 may be physical and/or logical.

The concepts described herein are not limited to the architecture of user equipment 170. Rather, user equipment 170 is provided as an example of one type of computing device that can be adapted to perform the functions of server 110 and/or a user interface device. For example, any suitable processor-based device can be utilized including, without limitation, personal data assistants (PDAs), tablet computers, smartphones, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user equipment 170, or certain components thereof, may reside at, or be installed in, different locations within system 100.

In some implementations, server 110 (and/or server 168) can include a server and/or cloud-based computing platform configured to perform operations and/or execute the steps described herein. Accordingly, server 110 (and/or server 168) may include a particular purpose computing system designed, configured, or adapted to perform and/or initiate operations, functions, processes, and/or methods described herein and can be communicatively coupled with a number of end user devices (e.g., user equipment 170), which can be, e.g., a computer, tablet, Smartphone, or other similar end user computing device. Users can interact with server 110 (and/or server 168) using a device via one or more networks, such as network 120, which itself can include one or more of a local intranet, a LAN (Local Area Network), a WAN (Wide Area Network), a virtual private network (VPN), and the like. As will be apparent to those of skill in the art, communicative coupling between different devices of system 100 can be provided by, e.g., one or more of wireless connections, a synchronous optical network (SONET) connection, a digital T1, TN, E1 or E3 line, Digital Data Service (DDS) connection, DSL (Digital Subscriber Line) connection, an Ethernet connection, and the like.

Figure 2:
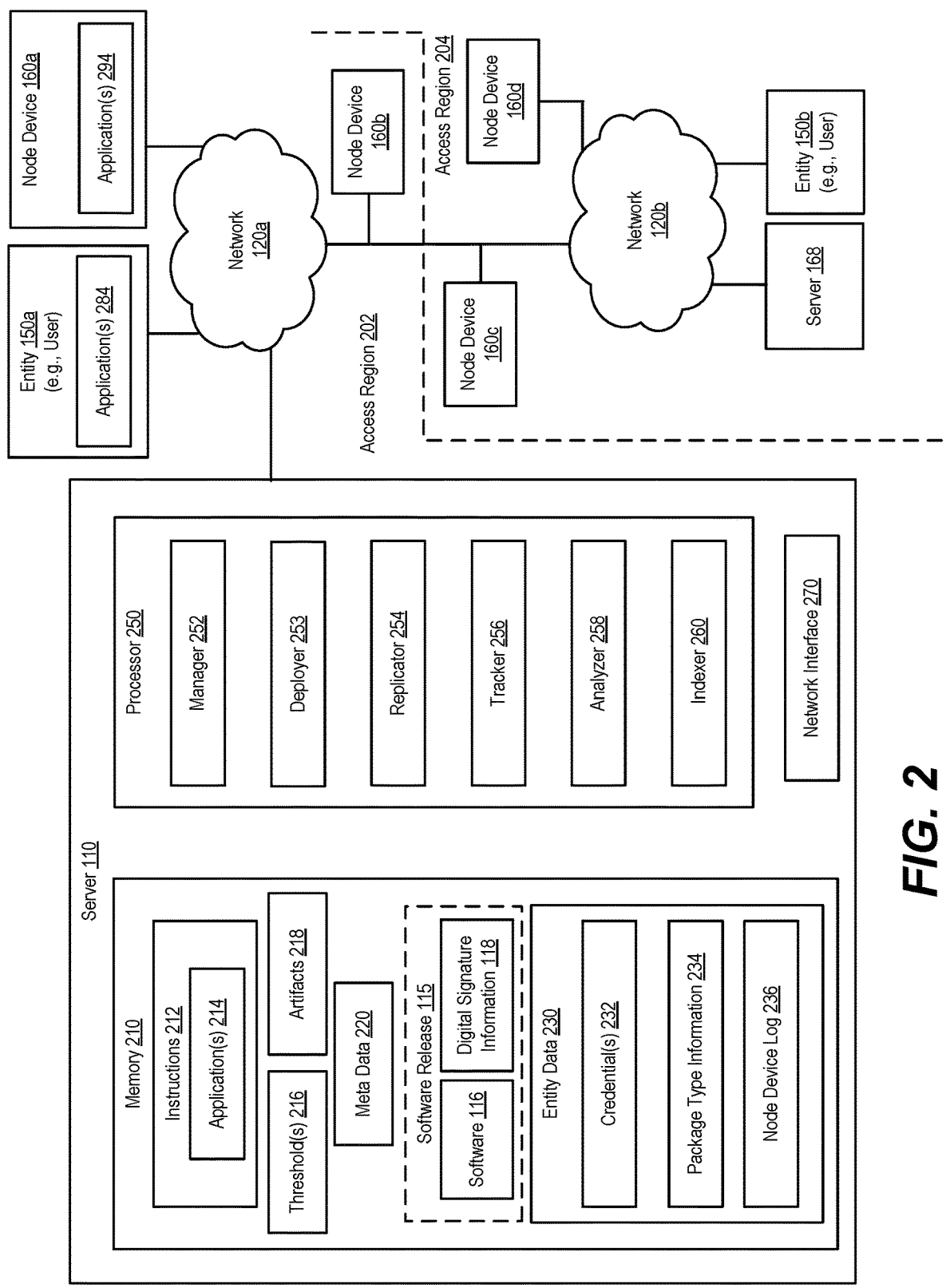
FIG. 2 is a block diagram of another example of a system for sharing digital signature information of a software release.

Referring to FIG. 2, a block diagram of a system for sharing digital signature information of a software release according to an embodiment is shown as a system 200. System 200 may include or correspond to at least a portion of system 100. System 200 includes server 110, networks 120*a*, 120*b*, entities 150*a*, 150*b*, node devices 160*a*, 160*b*, 160*c*, 160*d*, and server 168. As shown in FIG. 2, system 200 is spread across multiple regions, such as a first region 202 and a second region 204. For example, each region may correspond to a different city, county, state, country, continent, or other physical or logical distinction. To illustrate, first region 202 may include or correspond to North America (e.g., the United States) and second region 204 may include or correspond to Asia (e.g., Japan).

As shown, server 110 is included in first region 202 and server 168 is included in second region 204. Server 168 may be a repository server and may include or correspond to server 110. In some implementations, server 110 and server 168 may be included in a universal artifact management system. Networks 120*a*, 120*b* may include or correspond to network 120. Each of the entities 150*a*, 150*b* may include or correspond to entity 150. In some implementations, a first entity 150*a* and a second entity 150*b* may be part of the same group, company, etc., or may be part of different groups, companies, etc. Each of node devices 160*a*, 160*b*, 160*c*, 160*d* may include or correspond to node device 160. In some implementations, each of node devices 160*a*, 160*b*, 160*c*, 160*d* corresponds to the same entity. In other implementations, at least one node device of node devices 160*a*, 160*b*, 160*c*, 160*d* corresponds to another entity.

Server 110 may include a memory 210 (e.g., one or more memory devices), one or more processors 250, and a network interface 270. Network interface 270 may be configured to be communicatively coupled, via one or more networks (e.g., 120*a*, 120*b*) to one or more external devices, such as one or more of entities (e.g., 150*a*, 150*b*), one or more node devices (e.g., 160*a*, 160*b*, 160*c*, 160*d*), one or more servers (e.g., 168), one or more data sources (e.g., 130), or any combination thereof. For example, network interface 270 may include a transmitter, a receiver, or a combination thereof (e.g., a transceiver).

Memory 210 may include ROM devices, RAM devices, one or more HDDs, flash memory devices, SSDs, other devices configured to store data in a persistent or non-persistent state, or a combination of different memory devices. Memory 210 includes (e.g., is configured to store) instructions 212, thresholds 216, artifacts 218 (e.g., binaries), meta data 220, a transaction log 224, and entity data 230. For example, memory 210 may store instructions 212, that when executed by the one or more processors 250, cause the processor(s) 250 to perform functions, methods, processes, operations as described further herein. In some implementations, instructions 212 may include or be arranged as an application 214 (e.g., a software program) associated with a universal artifact repository. For example, application 214 may provide a portal via which one or more entities and/or users interact with and access server 110. Application 284 at entity 150a and application 294 at node device 160a are configured to enable entity 150a and node device 160a to communicate with and/or access server 110. In some implementations, each of application 284 and application 294 enable functionality as described with respect to server 110. In other implementations, application 284 and application 294 may enable and/or support less than all of the functionality as described with reference to server 110. To illustrate, application 294 may not provide functionality as described with reference to analyzer 258.

In some implementations, memory 210 includes multiple memories accessible by processor 250. In some such implementations, one or more of the memories may be external to server 110. To illustrate, at least one memory may include or correspond to a database accessible to server 110, such as a database that stores one or more thresholds 216, artifacts 218, meta data 220, software release 115, entity data 230, or any combination thereof. In some implementations, memory 210 may include or be coupled to cloud storage such that one or more thresholds 216, one or more of artifacts 218, meta data 220, software release 115, and/or entity data 230 is stored at a cloud storage location and accessible by server 110.

Threshold(s) 216 may include or correspond to one or more thresholds, such as a time period threshold, a size threshold, etc. Artifacts 218 may include or correspond to artifacts 114. Meta data 220 may include meta data for artifacts 114, meta data for application 214, meta data for one or more files (e.g., 116), or any combination thereof. Meta data for an artifact (e.g., 114) may include a file name, a file size, a checksum of the file, and/or one or more properties that annotate the artifact, such as when the artifact was created by a build, a build job name, an identifier of who initiated the build, a time the build was initiated, a build agent, a CI server, a build job number, and/or a quality assurance test passed indicator, as illustrative, non-limiting examples.

Software release 115 includes software 116 and software release information. Software release information includes information corresponding to software 116, such as one or more checksums, metadata, or a combination thereof, as further described in U.S. patent application Ser. No. 16/399, 905. The software release information may also include digital signature information 118. Software 116 may include one or more files (e.g., one or more of artifacts 218), and may correspond to a build job. Software 116 may be designated for distribution to entity devices as part of software release 115. Digital signature information 118 includes one or more digital signatures and metadata associated with at least one of the one or more digital signatures, such as an author of the signature, a time of the signature, a date of the signature, a development stage associated with the signature, etc.

Entity data 230 may include data associated with one or more entities. For example, entity data 230 may include or correspond to one or more of entity 150a, 150b. Entity data 230 may include one or more credentials 232, package type information 234, and a node device log 236. Credential 232 include login information to enable one or more users and/or one or more entities to access server 110. Additionally, or alternatively, credential 232 may include security or authentication information, such as a private key, a public key, and/or a token of a user and/or entity. Package type information 234 may identify one or more package types used by the corresponding entity. As illustrative, non-limiting examples, the one or more package types may include Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS. Node device log 236 includes node device information of one or more node devices corresponding to an entity of entity data 230. To illustrate, node device log 236 may include topology information (e.g., location information) of one or more node devices, one or more node device identifiers, owner/manager information, file and/or software information (e.g., name, version number, size, etc.) installed at one or more node devices, or any combination thereof, as illustrative, non-limiting examples. In some implementations, node device log 236 may indicate a list of target nodes at which one or more security objects are to be synchronized.

Processor 250 may include may be a CPU (e.g., processor 172) or microprocessor, a graphics processing unit ("GPU"), a field-programmable gate array (FPGA) device, an application-specific integrated circuits (ASIC), another hardware device, a firmware device, a microcontroller, or any combination thereof that has been programmed to perform the functions. As shown in FIG. 2, in an implementation, server 110 (e.g., processor 250) may include a manager 252, a deployer 253, a replicator 254, a tracker 256, an analyzer 258, and an indexer 260. In some implementations, processor 250 may include one or more modules. For example, each of manager 252, deployer 253, replicator 254, tracker 256, analyzer 258, and indexer 260 may include or correspond to one or more modules. In an implementation, server 110 (e.g., processor 250 or modules 252, 253, 254, 256, 258, 260) may be configured to execute one or more routines that perform various operations as described further herein. A module is "[a] self-contained hardware or software component that interacts with a larger system." Alan Freedman, "The Computer Glossary" 268 (8th ed. 1998). A module may include a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

In some implementations, one or more of modules (e.g., 252, 253, 254, 256, 258, 260) may locally reside in memory 210 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Referring to processor 250, manager 252 may be configured to enable a user (e.g., 150a) to manage one or more other components/modules (e.g., 253, 254, 256, 258, 260) of processor 250. Additionally, or alternatively, manager 252 may enable storage of and/or access to one or artifacts 218. In some implementations, manager 252 may enable administration of multiple instances of a user account, such as a first instance at server 110 and a second instance at server 168. Accordingly, manager 252 may be configured to operate as an administrative tool that enables an entity (e.g., 150a) to monitor and control a first instance of a user account (corresponding to first region 202) and a second instance of the user account (corresponding to second region 204). For example, the entity (e.g., 150a) may be able to see which services (e.g., 253, 254, 256, 258, 260) are operating in different regions, add/modify/remove individual users in different regions, set different permissions for individual users in different regions, provide and store one or more public keys, etc. In some implementations, manager 252 includes a manager module that includes one or more routines, executable by one or more processors (e.g., the processor 172 of FIG. 1) or processor 250 to enable a user (e.g., 150a) to manage one or more other components/modules (e.g., 253, 254, 256, 258, 260) of processor 250, as described herein.

Deployer 253 may be configured to perform a software release distribution. For example, deployer 253 provides a secure and structured platform to distribute release binaries as a single coherent release bundle to multiple remote locations and update them as new release versions are produced. A release bundle may include one or more files and/or release bundle information which includes or indicates a list of the one or more files (e.g., artifacts) to be included in the release bundle and meta data (e.g., properties) associated with the release bundle. For example, software release 115 may include software 116 (e.g., one or more files) and software release information which includes metadata corresponding to software 116. The release bundle information may include, for each file of the bundle release, a checksum (of the file), meta data (corresponding to the file), or both. In some implementations, the release bundle also includes additional meta data (e.g., file name, file size, path to the file, etc.) corresponding to the release bundle, such as a release bundle name, a version number, a source identifier, description information, release data, and/or a size. The software release information may also include digital signature information 118 which includes digital signatures and, in some implementations, digital signature metadata that corresponds to at least one of the digital signatures. Additionally, or alternatively, the software release information may include a signature (or other cryptography technique) to render the release bundle information immutable. In some implementations, the signature corresponding to the release bundle is different from the digital signatures (e.g., generated by development stages of the development process). In other implementations, one of the digital signatures may be used to render the release bundle information immutable.

Deployer 253 may enable generation of a release bundle, auditing and traceability by tracking all changes associated with a release bundle distribution of the release bundle including permission levels release content, scheduling of a release bundle for distribution, tracking of a release bundle, stopping distribution of a release bundle, and/or selection of target destinations. Additionally, or alternatively, a software release may be provisioned amongst one or more nodes devices (e.g., 160a, 160b, 160c, 160d). In some implementations, as part of the release flow, release bundles are verified by the source and/or destination to ensure that they are signed correctly and safe to use. In some implementations, deployer 253 includes a deployer module that includes one or more routines, executable by one or more processors (e.g., the processor 172 of FIG. 1) or processor 250 to perform a software release distribution.

Replicator 254 may be configured to coordinate and provide one or more artifacts (e.g., one or more files) and/or meta data between two or more devices. For example, replicator 254 may coordinate transfer of one or more artifacts (e.g., one or more files) and/or meta data between server 110 and server 168, between server 110 and one or more of node devices 160a, 160b, 160c, 160d, or both. In some implementations, replicator 254 is configured to be used in conjunction with deployer 253 to distribute a software release, provide efficient network utilization by optimizing replication, and reduce network load and/or release bundle synchronization time from source device (e.g., server 110) to target instance (e.g., server 168) or node device (e.g., 160a, 160b, 160c, 160d). Additionally, or alternatively, replicator 254 may be configured to identify a difference between at least one file stored at a first device (e.g., server 110) and one or more files stored at a second device (e.g., server 168 or a node device), and initiate transfer of at least one or more portions of a file to the second device. In some implementations, replicator 254 includes a replicator module that includes one or more routines, executable by one or more processors (e.g., the processor 172 of FIG. 1) or processor 250 to coordinate and provide one or more artifacts (e.g., one or more files) and/or meta data between two or more devices.

Tracker 256 may be configured to track one or more artifacts, meta data, one or more release bundles, or any combination thereof deployed or attempted to be deployed to a node device, such as one or more of node devices 160a, 160b, 160c, 160d, a server (e.g., server 110, 168), or both. In some implementations, tracker 256 includes a tracker module that includes one or more routines, executable by one or more processors (e.g., the processor 172 of FIG. 1) or processor 250 to track one or more artifacts, meta data, one or more release bundles, or any combination thereof deployed or attempted to be deployed to a node device, such as one or more of node devices 160a, 160b, 160c, 160d, and/or one or more servers.

Analyzer 258 may be configured to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact). In some implementations, analyzer 258 is configured to analyze data stored at memory 210, identify issues related to deployed software, perform recursive scanning, and perform an impact analysis. In some implementations, analyzer 258 includes an analyzer module that includes one or more routines, executable by one or more processors (e.g., the processor 172 of FIG. 1) or processor 250 to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact).

Indexer 260 may be configured to provide an indexing capability, including maintaining interdependencies and information, for one or more package types. Additionally, or alternatively, indexer 260 is configured to generate meta data (e.g., 220), such as meta data defined by a universal artifact repository manager and utilized by one or more of manager 252, deployer 253, replicator 254, tracker 256, and analyzer 258. In some implementations, indexer 260 includes an indexer module that includes one or more routines, executable by one or more processors (e.g., the processor 172 of FIG. 1) or processor 250 to provide an indexing capability, including maintaining interdependencies and information, for one or more package types.

Figure 3:
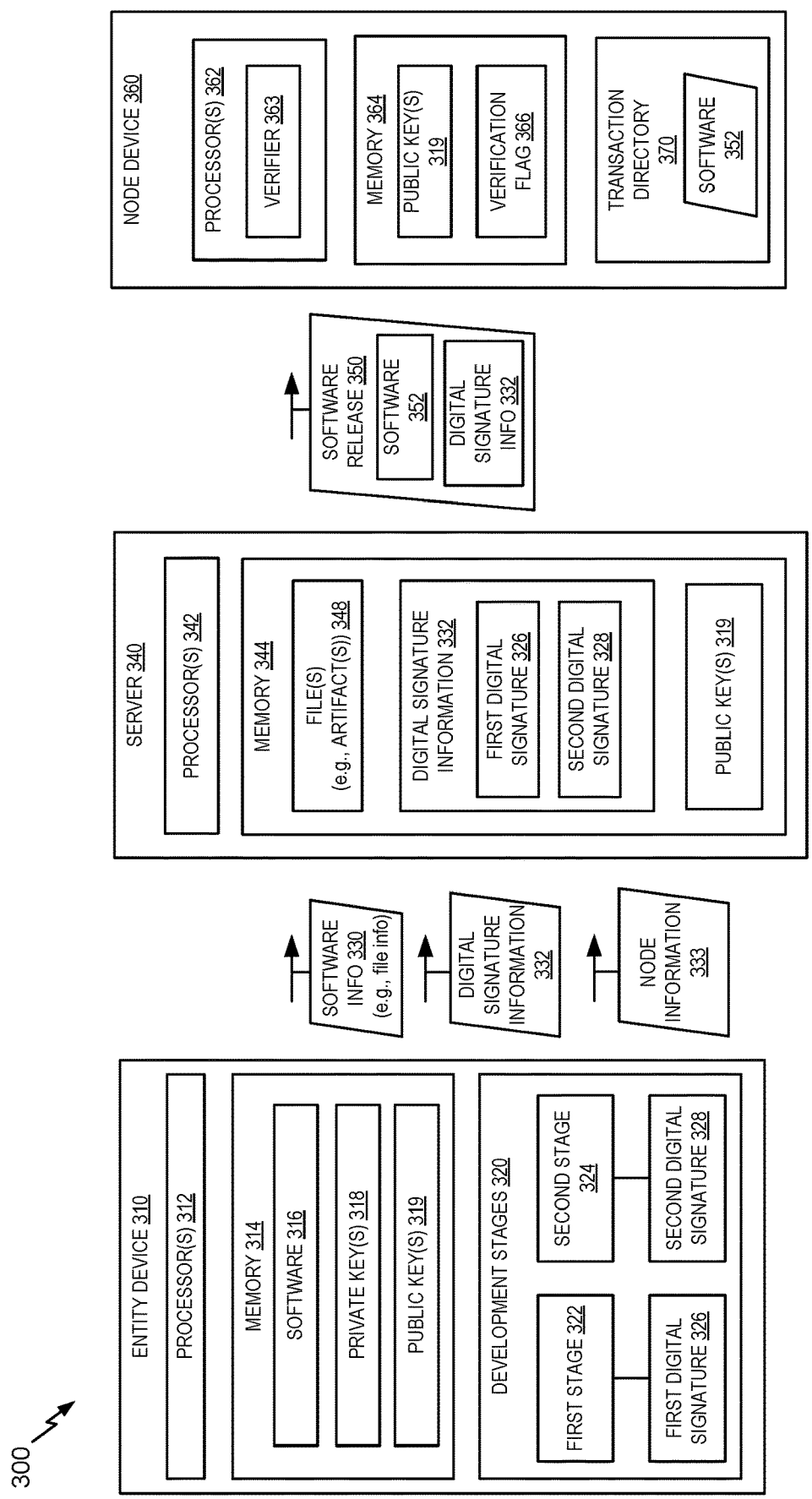
FIG. 3 is a block diagram of another example of a system for sharing digital signature information a software release.

Referring to FIG. 3, a block diagram of a system for sharing digital signature information of a software release is shown and designated 300. System 300 may include or correspond to at least a portion of system 100 and/or system 200. System 300 includes an entity device 310, a server 340, and a node device 360. Entity device 310, server 340, and node device 360 may be coupled via one or more networks, such as network 120. Entity device 310 may include or correspond to entity server 140, entity 150, 150a, 150b, or any combination thereof. Server 340 may include or correspond to server 110, server 168, or a combination thereof. Node device 360 may include or correspond to node device 160, 160a, 160b, 160c, 160d.

Entity device 310 includes one or more processors 312 and a memory 314. Memory 314 includes software 316 (e.g., one or more files), one or more private keys 318, and one or more public keys 319. Public keys 319 correspond to private keys 318. For example, a digital signature that is encrypted using a particular private key can be decrypted through use of a corresponding particular public key. Additionally, memory 314 may include instructions (not shown) that are executable by processor 312 to cause processor 312 to perform one or more operations. In some implementations, the instructions may include or be arranged as an application, such as application 284 (e.g., a software program), associated with server 340. Entity device 310 also includes multiple development stages 320. The development stages are of a development process for software, and include development stages such as building, unit tests, integration tests, and assembly, as non-limiting examples. In a particular implementation, development stages 320 include a first development stage 322 and a second development stage 324. In other implementations, more than two development stages may be included in development stages 320. Although system 300 is described as included one entity device 310, in other implementations, system 300 may include multiple entity devices (e.g., 310) coupled to server 340.

Server 340 includes one or more processors 342 and a memory 344. Memory 344 may include or correspond to memory 210. Memory 344 includes a one or more files 348 (e.g., artifacts). The one more files 348 may include or correspond to artifacts 114 and/or artifacts 218. Additionally, memory 344 may include instructions (not shown) that are executable by processor 342 to cause processor 342 to perform one or more operations. In some implementations, the instructions may include or be arranged as an application, such as application 214 (e.g., a software program).

Although system 300 is described as including one server 340, in other implementations, system 300 may include multiple servers (e.g., 340) coupled to entity device 310 and/or node device 360. Additionally, or alternatively, it is noted that server 340 (e.g., processor 342) may include one or more additional components or modules, such as manager 252, deployer 253, replicator 254, tracker 256, analyzer 258, and/or indexer 260, as illustrative, non-limiting examples.

Node device 360 includes one or more processors 362, a memory 364 (e.g., one or more memories), and a transaction directory 370. Transaction directory 370 may include or correspond to a storage device configured to receive and store one or more files. In some implementations, transaction directory 370 is distinct from memory 364. In other implementations, transaction directory includes a logical or virtual portion of memory 364.

Memory 364 may include instructions (not shown) that are executable by processor 362 to cause processor 362 to perform one or more operations. In some implementations, the instructions may include or be arranged as an application, such as application 294 (e.g., a software program). Additionally, or alternatively, memory 364 may include one or more files (e.g., software), such as software corresponding to a release bundle.

Processor 362 includes a verifier 363. Verifier 363 is configured to verify whether software (e.g., one or more files) has successfully completed one or more of the multiple development stages of development stages 320. For example, verifier 363 may verify that one or more files have successfully completed an initial development stage, an intermediate development stage, a final development stage, or multiple development stages. In some implementations, verifier 363 includes a verifier module that includes one or more routines, executable by one or more processors (e.g., the processor 172 of FIG. 1) or processor 362 to verify whether software has successfully completed the multiple development stages of development stages 320.

Although system 300 is described as including one node device 360, in other implementations, system 300 may include multiple node devices (e.g., 360) coupled to server 340. Additionally, or alternatively, it is noted that node device 360 (e.g., processor 362) may include one or more additional components or modules, such as manager 252 and/or replicator 254, as illustrative, non-limiting examples.

During operation of system 300, entity device 310 performs development stages 320 on software 316 (e.g., one or more files). Upon successful completion of a development stage, a corresponding digital signature is generated and encrypted using a private key. For example, upon successful completion of first development stage 322, first digital signature 326 is generated. As another example, upon successful completion of second development stage 324, second digital signature 328 is generated. In a particular implementation, first development stage 322 corresponds to a unit test, and second development stage 324 corresponds to an integration test. In other implementations, first development stage 322 and second development stage 324 correspond to other development stages. As another example, a digital signature may be generated when an initial development stage is completed, a digital signature may be generated when an intermediate development stage is completed, and a digital signature may be generated when a final development stage is completed. In some implementations, at least one development stage can have two or more digital signatures (e.g., there may be different digital signatures for when different sets of files complete the same development stage). In some implementations, each digital signature may correspond to a software build job. For example, each digital signature represents successful completion by a software build job of a corresponding development stage. In some implementations, additional digital signature may be generated. For example, first digital signature 326 and second digital signature 328 may correspond to a first artifact, a third digital signature may be generated when a second artifact completes first development stage 322, a fourth digital signature may be generated when the second artifact completes second development stage 324, and a fifth digital signature may be generated when the first artifact and the second artifact complete a third development stage of development stages 320. The third development stage may correspond to an assembly stage, as further described with reference to FIG. 4.

First digital signature 326 is generated using a first private key, and second digital signature 328 is generated using a second private key. The first and second private keys are stored at memory 314 as private keys 318. In some implementations, the first private key is a one-time use private key that corresponds to the first development stage 322, and the second private key is a one-time use private key that corresponds to the second development stage 324. Additionally, the first private key and the second private key correspond to a first public key and a second public key, respectively. The first and second public keys are stored at memory 324 as public keys 319. Although two private keys and two public keys are described, in other implementations, more than two private keys and more than two public keys may be used, such as based on the number of development stages in development stages 320.

Entity device 310 generates software information 330 and transmits the software information 330 to server 340. Software information 330 may include an indication of one or more files included in software 316. As an example, software information 330 may include a list of the files that are included in software 316. Additionally, or alternatively, the indication of the one or more files may include a checksum for each of the one or more files, a checksum for the entirety of the one or more files, or a combination thereof. In some implementations, entity device also transmits software 316 to server 340. Server 340 receives software information 330 from entity device 310 and identifies files 348 (e.g., artifacts) that correspond to software 316. Alternatively, server 340 receives software 316 from entity device and stores software 316 at memory 344 as files 348.

Entity device 310 also generates digital signature information 332 and transmits digital signature information 332 to server 340. Digital signature information 332 includes a plurality of digital signatures that correspond to development stages of development stages 320. In the example illustrated in FIG. 3, digital signature information 332 includes first digital signature 326 (corresponding to first development stage 322) and second digital signature 328 (corresponding to second development stage 324). Digital signature information 332 may also include digital signature metadata that corresponds to the digital signatures. For example, digital signature information 332 may include, for each digital signature, an author of the digital signature, a development stage corresponding to the digital signature, a time corresponding to generation of the particular digital signature, a build job number corresponding to the particular digital signature, or any combination thereof. Server 340 receives digital signature information 332 and stores digital signature information 332 at memory 344. In some implementations, server 340 may maintain information indicating the digital signatures. In such implementations, server 340 may maintain a ledger that includes the multiple digital signatures and digital signature metadata corresponding to the multiple digital signatures.

In some implementations, entity device 310 also generates and/or provides node information 333. Node information 333 includes an indication of one or more node devices, such as node device 360, that software 316 is to be released to. In some implementations, node information 333 may indicate one or more distribution paths that are to be used to distribute software 316 to the one or more node devices. Server 340 receives node information 333 from entity device 310 and uses node information 333 to determine which node devices to send a software release to.

In some implementations, entity device 310 transmits one or more public keys 319 to server 340. For example, entity device 310 may transmit a first public key corresponding to first digital signature 326 (e.g., corresponding to the first private key used to generate first digital signature 326) and a second public key corresponding to second digital signature 328 (e.g., corresponding to the second private key used to generate second digital signature 328) to server 340. In such implementations, server 340 receives public keys 319 and stores public keys 319 at memory 344 for later transmission to node device 360. In an alternate implementation, entity device 310 transmits public keys 319 directly to node device 360.

After receiving software information 330, digital signature information 332, and optionally node information 333, server 340 generates software release information that includes the digital signatures and the files 348. For example, server 340 may generate software release 350. Software release 350 includes software 352 (e.g., corresponding to files 348 and software 316) and software release information that includes digital signature information 332 (that includes multiple digital signatures, such as first digital signature 326 and second digital signature 328). Server 340 transmits software release 350 (including the software release information) to node device 360 based on node device 360 being indicated in node information 333. Server 340 also transmits software release 350 to other node devices indicated by node information 333. In some implementations, server 340 also transmits one or more public keys 319 to node device 360, and node device 360 store the one or more public keys 319 at memory 364.

After receiving software release 350 from server 340 (e.g., an artifact repository server) and one or more public keys 319 (either from server 340 or from entity device 310), node device 360 identifies the one or more files indicated in the software release information. In some implementations, node device 360 already stores at least one of the one or more files, and the one or more files are transferred to transaction directory 370 as software 352. In other implementations, software 352 is received from server 340 and stored in transaction directory 370.

After identifying (and/or receiving) software 352, node device 360 performs one or more verification operations on software 352. For example, verifier 363 verifies whether software 352 has completed development stages 320 based on the multiple digital signatures and public keys 319. To illustrate, verifier 363 may decrypt a particular digital signature using the corresponding public key to determine whether the particular digital signature is valid. If the particular digital signature is valid, verifier 363 determines that software 352 successfully completed the corresponding development stage of development stages 320.

In some implementations, verifier 363 may identify the public key that corresponds to the particular signature based on digital signature information 332. For example, digital signature information 332 may indicate that a first digital signature corresponds to a first author, and verifier 363 may identify a public key that corresponds to the first author for use in decrypting the first digital signature. In some implementations, multiple public keys may correspond to the same author, and verifier 363 may try each of the multiple public keys to decrypt the first digital signature.

Node device 360 processes software 352 based on verifying that software 352 (e.g., the one or more files) has completed the development stages 320. For example, if verifier 363 verifies that software 352 has completed development stages 320, node device 360 may load software 352 to memory 364 (or another memory other than transaction directory 370). Additionally, node device 360 may set verification flag 366 to indicate that software 352 has successfully completed development stages 320. Processing software 352 may also include executing software 352 at node device 360. Node device 360 may also transmit a notification to server 340, the notification indicating that software 352 is accepted. Alternatively, if verifier 363 fails to verify that software 352 has completed development stages 320, node device 360 may discard (e.g., delete) software 352 from transaction directory 370 and transmit a notification to server 340, the notification indicating that software 352 is rejected. Additionally, node device 360 may clear verification flag 366. In some implementations, the notification may identify which digital signature is not verified, which development stage corresponds to the unverified digital signature, an author that corresponds to the unverified digital signature, or a combination thereof. The notification may be sent from the server 340 to the entity device 310.

Although described as node device 360 performing the verification operations, in some implementations, server 340 may include a verifier (e.g., 363) and server 340 may perform one or more verification operations on behalf of node device 360. For example, server 340 may use the public keys to decrypt one or more digital signatures included in digital signature information 332 to verify the one or more digital signatures. Server 340 may then deploy the verified files to node device 360. In some implementations, if a file is not verified, the file is not transmitted to node device 360, server 340 notifies entity device 310, or a combination thereof. Additionally, or alternatively, server 340 may verify some of the files and transmit the digital signatures and public keys for the files that server 340 does not attempt to verify to node device 360.

Although described as transmitting multiple digital signatures, in some implementations, a single digital signature may be generated and transmitted from entity device 310. For example, first digital signature 326 may correspond to an initial development stage or an intermediate development stage, and first digital signature 326 may be included in digital signature information 332. Alternatively, second digital signature 328 may correspond to an intermediate development stage or a final development stage, and second digital signature 328 may be included in digital signature information 332. Digital signature information 332 may be used by node device 360 (or server 340) along with public keys 319 to verify whether software 352 has successfully completed a corresponding development stage of development stages 320.

According to yet another embodiment, a system for sharing digital signature information of a software release is described. The system includes at least one memory (e.g., 344) storing instructions and one or more processors (e.g., 342) coupled to the at least one memory. The one or more processors are configured to execute the instructions to cause the one or more processors to receive, from an entity device (e.g., 310), file information (e.g., 330) corresponding to one or more files of a software release. The one or more processors are further configured to execute the instructions to cause the one or more processors to receive multiple digital signatures (e.g., 332) from the entity device. Each digital signature corresponds to a development stage of multiple development stages (e.g., 320) of the software release. The one or more processors can further be configured to execute the instructions to cause the one or more processors to receive node information (e.g., 333) corresponding to one or more node devices (e.g., 360) to receive the software release. The one or more processors can be configured to execute the instructions to cause the one or more processors to generate software release information (e.g., 350) including the multiple digital signatures and an indication of the one or more files. The one or more processors can be further configured to execute the instructions to cause the one or more processors to initiate transmission of the software release information to the one or more node devices.

In some implementations, the multiple digital signatures are generated using one or more private keys, and the one or more processors are further configured to receive one or more public keys (e.g., 319) that correspond to the one or more private keys and to initiate transmission of the one or more public keys to the one or more node devices. Additionally, or alternatively, each digital signature of the multiple digital signatures corresponds to a software build job. Additionally, or alternatively, the one or more processors are further configured to maintain a ledger of digital signatures, the ledger including the multiple digital signatures and digital signature metadata (e.g., 332) corresponding to the multiple digital signatures.

According to another embodiment, a computer program product is described that includes a computer-readable storage device, such as a non-transitory computer-readable storage medium, that includes instructions that, when executed by one or more processors (e.g., 342), cause the one or more processors to perform operations for sharing digital information of a software release. The operations include executing a first routine to receive file information (e.g., 330) corresponding to one or more files of a software release from an entity device (e.g., 310). The operations further include executing a second routine to receive multiple digital signatures (e.g., 332) from the entity device. Each digital signature corresponds to a developmental stage of multiple development stages (e.g., 320) of the software release. The operations also include executing a third routine to receive node information (e.g., 333) corresponding to one or more node devices (e.g., 360) from the entity device, executing a fourth routine to generate software release information (e.g., 350) including the multiple digital signatures and an indication of the one or more files, and executing a fifth routine to initiate transmission of the software release information to the one or more node devices.

According to yet another embodiment, a system for receiving a software release is described. The system includes at least one memory (e.g., 364) storing instructions and one or more processors (e.g., 362) coupled to the at least one memory. The one or more processors are configured to execute the instructions to cause the one or more processors to receive software information (e.g., 350) including an indication of one or more files and multiple digital signatures (e.g., 332) corresponding to different development stages of multiple development stages (e.g., 320) of a software release. The one or more processors are further configured to execute the instructions to cause the one or more processors to receive one or more public keys (e.g., 319) associated with the one or more private keys used to generate the multiple digital signatures. The one or more processors are also configured to execute the instructions to cause the one or more processors to identify the one or more files (e.g., 352) based on the indication. The one or more processors are also configured to execute the instructions to cause the one or more processors to verify the multiple digital signatures based on the one or more public keys. The one or more processors are further configured to execute the instructions to cause the one or more processors to process the one or more files based on verification of the multiple digital signatures.

In a particular implementation, the one or more processors are further configured to identify a first public key of the one or more public keys that corresponds to a first digital signature of the multiple digital signatures based on an author of the first digital signature and an author associated with the first public key. Additionally, or alternatively, verifying that the one or more files have completed the multiple stages of development includes decrypting the multiple digital signatures using the one or more public keys. Additionally, or alternatively, the software release information is received from an artifact repository server (e.g., 340). Alternatively, the software release information is received from an entity device (e.g., 310).

According to another embodiment, a computer program product is described that includes a computer-readable storage device, such as a non-transitory computer-readable storage medium, that includes instructions that, when executed by one or more processors (e.g., 362), cause the one or more processors to perform operations for verification of a deployed software release. The operations include executing a first routine to receive software release information (e.g., 350) including an indication of one or more files and multiple digital signatures (e.g., 332) corresponding to different development stages of multiple development stages (e.g., 320) of a software release. The operations include executing a second routine to receive one or more public keys (e.g., 319) associated with one or more private keys used to generate the multiple digital signatures. The operations further include executing a third routine to identify the one or more files (e.g., 352) based on the indication, and executing a fourth routine to verify the multiple digital signatures based on the one or more public keys. The operations also include executing a fifth routine to process the one or more files based on verification of the multiple digital signatures.

Thus, system 300 describes generation and/or use of digital signatures to verify whether software 352 has completed at least one of development stages 320. For example, digital signature information 332 (including one or more digital signatures) may be included in software release 350 that is transmitted to node device 360. Digital signature information 332 and public keys 319 may advantageously be used by node device 360 (or server 340) to verify whether software 352 has successfully completed one or more of development stages 320. Thus, node device 360 may refrain from processing software that has not completed one or more of development stages 320, which may prevent node device 360 from being exposed to vulnerabilities corresponding to software that is not fully developed and tested (e.g., has not successfully completed the development stages 320). This may also prevent insertion of unauthorized code into software 352 after completion of a development stage.

Figure 4:
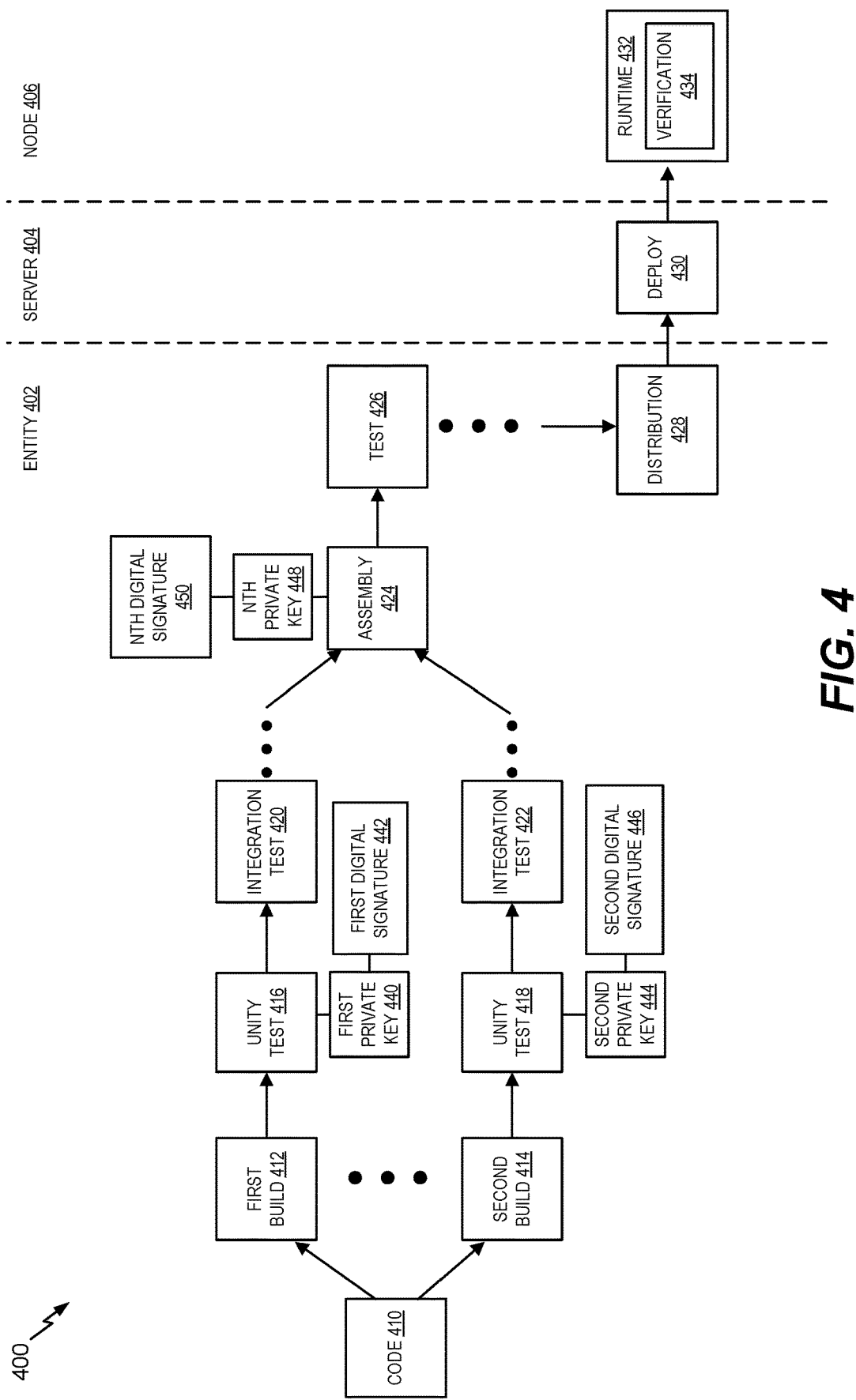
FIG. 4 is a block diagram of an example of multiple development stages of a software release that generate digital signatures.

Referring to FIG. 4, a block diagram of an example of multiple development stages of a software release are shown and designated 400. Multiple development stages 400 may include or correspond to development stages 320.

In the example of FIG. 4, multiple development stages 400 include code generation 410, first build 412, second build 414, unity test 416, unity test 418, integration test 420, integration test 422, assembly 424, additional testing 426, distribution 428, deployment 430, and runtime 432. In other implementations, fewer development stages or more development stages may be included. In the example of FIG. 4, code generation 410, first build 412, second build 414, unity test 416, unity test 418, integration test 420, integration test 422, assembly 424, additional testing 426, and distribution 428 are performed at entity 402, deployment 430 is performed at server 404, and runtime 432 is performed at node 406. Entity 402 may include or correspond to entity server 140, entity 150, 150a, 150b, entity device 310, or any combination thereof. Server 404 may include or correspond to server 110, server 168, server 340, or any combination thereof. Node 406 may include or correspond to node device 160, 160a, 160b, 160c, 160d, node device 360, or any combination thereof.

To start the development process, code may be generated at code generation 410. For example, code for one or more files (e.g., artifacts) may be generated or developed. The code may be combined into a first build job at first build 412. The first build job may undergo unity testing at unity test 416. Upon successful completion of unity test 416, a first digital signature 442 is generated. First digital signature 442 may be generated using first private key 440. In a particular implementation, first private key 440 corresponds to unity test 416 or to a particular user who certifies completion of unity test 416. In some implementations, first private key 440 may be a one-time use private key. First digital signature 442 may be provided to server 404 for storage and eventual transmission to node 406, similar to as described with reference to FIG. 3. Additionally, a first public key that corresponds to first private key 440 may be provided to server 404 for storage and eventual transmission to node 406, similar to as described with reference to FIG. 3.

After completion of unity test 416, and generation of first digital signature 442, the first build job may undergo integration test 420. Another digital signature may be generated upon completion of integration test 420, similar to first digital signature 442. After completion of integration test 420, the first build job may undergo additional tests or other development stages.

In addition to generating the first build job, the code may be combined into a second build job at second build 414. Although two builds are shown in FIG. 4, in other implementations, the code may undergo a single build or more than two builds. Also, although described as different build jobs, the first build job and the second build job may be different portions of the same build job. The second build job may undergo unity testing at unity test 418. Upon successful completion of unity test 418, a second digital signature 446 is generated. Second digital signature 446 may be generated using second private key 444. In a particular implementation, second private key 444 corresponds to unity test 418 or to a particular user who certifies completion of unity test 418. In some implementations, second private key 444 may be a one-time use private key. Second digital signature 446 may be provided to server 404 for storage and eventual transmission to node 406. Additionally, a second public key that corresponds to second private key 444 may be provided to server 404 for storage and eventual transmission to node 406.

After completion of unity test 418, and generation of second digital signature 446, second build job may undergo integration test 422. Another digital signature may be generated upon completion of integration test 422, similar to second digital signature 446. After completion of integration test 422, the second build job may undergo additional tests or other development stages.

The first build job and the second build job (e.g., the first portion and the second portion) may be combined at assembly 424. Upon successful completion of assembly 424, an Nth digital signature 450 is generated, where N is a positive integer. Nth digital signature 450 may be generated using Nth private key 448. In a particular implementation, Nth private key 448 corresponds to assembly 424 or to a particular user who certifies completion of assembly 424. In some implementations, Nth private key 448 is a one-time use private key. Nth digital signature 450 may be provided to server 404 for storage and eventual transmission to node 406. Additionally, an Nth public key that corresponds to Nth private key 448 may be provided to server 404 for storage and eventual transmission to node 406.

After completion of assembly 424, the build may undergo additional testing 426. Another digital signature may be generated upon completion of additional testing 426, similar to Nth digital signature 450. After completion of the additional testing 426, the build job may undergo one or more other testing stages or development stages prior to distribution 428.

At distribution 428, the software corresponding to the build job (e.g., the one or more files of the software release) is provided to server 404 for deployment. Server 404 may deploy the software release at 430, including transmitting the software release (and digital signatures) to one or more node devices, including node 406. At runtime 432, the software release undergoes verification 434. For example, a verifier (e.g., 363) may verify that the software release has successfully completed one or more of development stages 410-428 based on the digital signatures (e.g., first digital signature 442, second digital signature 446, and Nth digital signature 450) and the public keys, as described with reference to FIG. 3. For example, node 406 may decrypt the digital signatures using the public keys to verify the digital signatures before processing the software release.

Thus, FIG. 4 illustrates an example of generation of digital signature during development stages of a software release. The digital signature information, and corresponding public keys, can be used by a node device to enable the node device to verify completion of the development stages for a software release, which may prevent the node device from being exposed to vulnerabilities of software that is not fully developed or tested.

Figure 5:
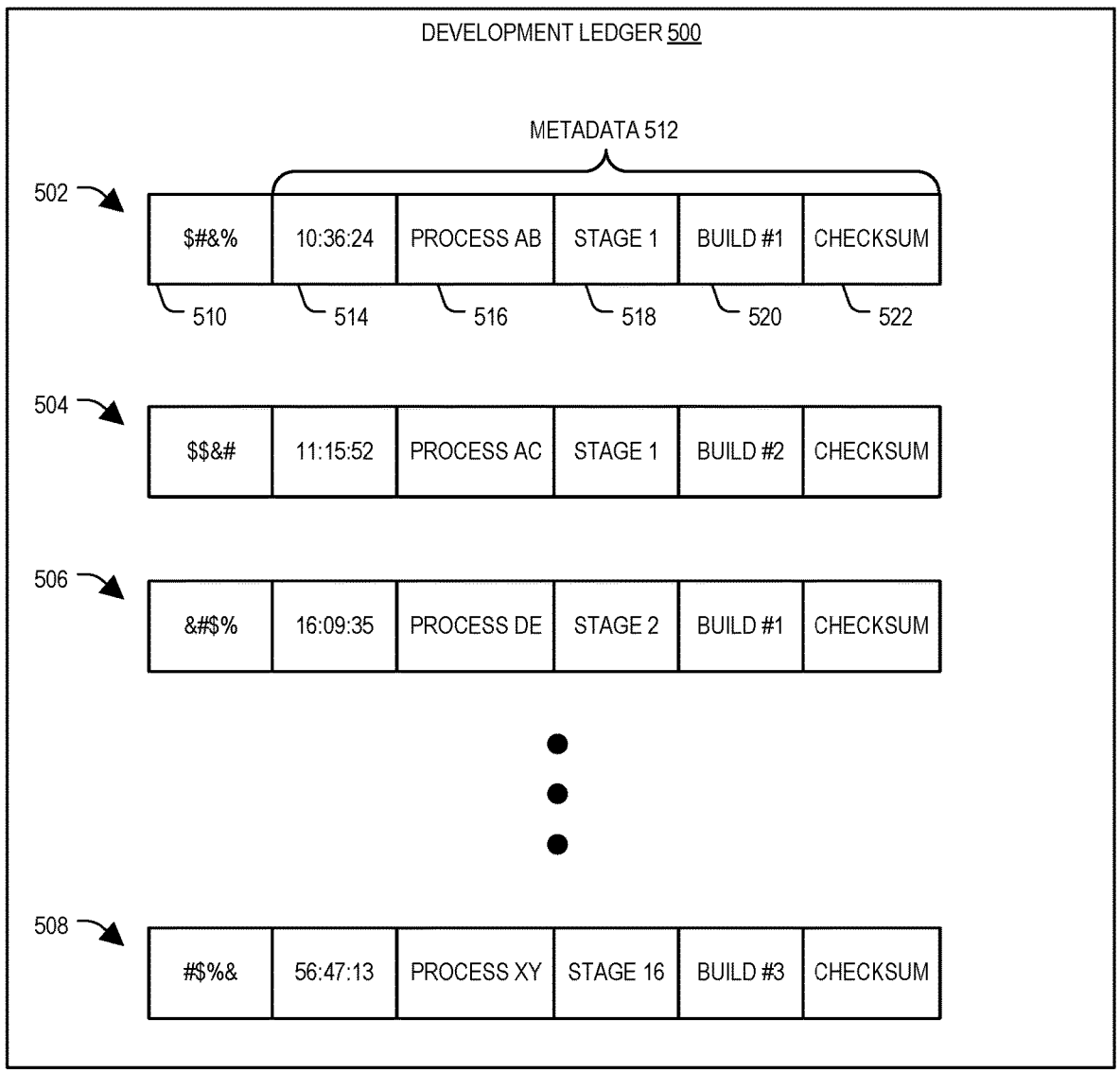
FIG. 5 illustrate an example of a development ledger that stores digital signatures and digital signature metadata.

Referring to FIG. 5, an example of a development ledger 500 is shown. Development ledger 500 may be maintained by a server, such as server 110, server 168, server 340, server 404, or any combination thereof. The development ledger 500 is based on digital signatures and digital signature metadata, such as the digital signatures and digital signature metadata included in digital signature information 332.

Development ledger 500 includes one or more entries indicating digital signatures and digital signature metadata. For example, development ledger 500 may include a first entry 502, a second entry 504, a third entry 506, and a fourth entry 508. Although FIG. 5 illustrates four entries, in other implementations, development ledger 500 includes fewer than four or more than four entries, based on the number of digital signatures received from an entity device.

Each entry includes a digital signature and corresponding metadata. For example, first entry 502 includes a first digital signature 510 ("$#&%") and digital signature metadata 512. Digital signature metadata 512 includes information corresponding to first digital signature 510. For example, digital signature metadata 512 includes a time value 514 (e.g., a time that first digital signature 510 was generated), an author 516 (e.g., an author of first digital signature 510), a development stage 518 (e.g., a development stage corresponding to first digital signature 510), a build number 520 (e.g., a build number of the files that successfully completed development stage 518), and a checksum 522 (e.g., a checksum corresponding to first digital signature 510). Similarly, second entry 504, third entry 506, and fourth entry 508 each include a digital signature, a time, an author, a development stage, a build number, and a checksum. In other implementations, the digital signature metadata may include other or different information.

Thus, FIG. 5 illustrates an example of a development ledger 500. The development ledger 500 is used to store digital signatures and digital signature metadata for transmission to node devices to enable the node devices to verify that a software release has successfully completed multiple development stages of a development process.

Figure 6A:
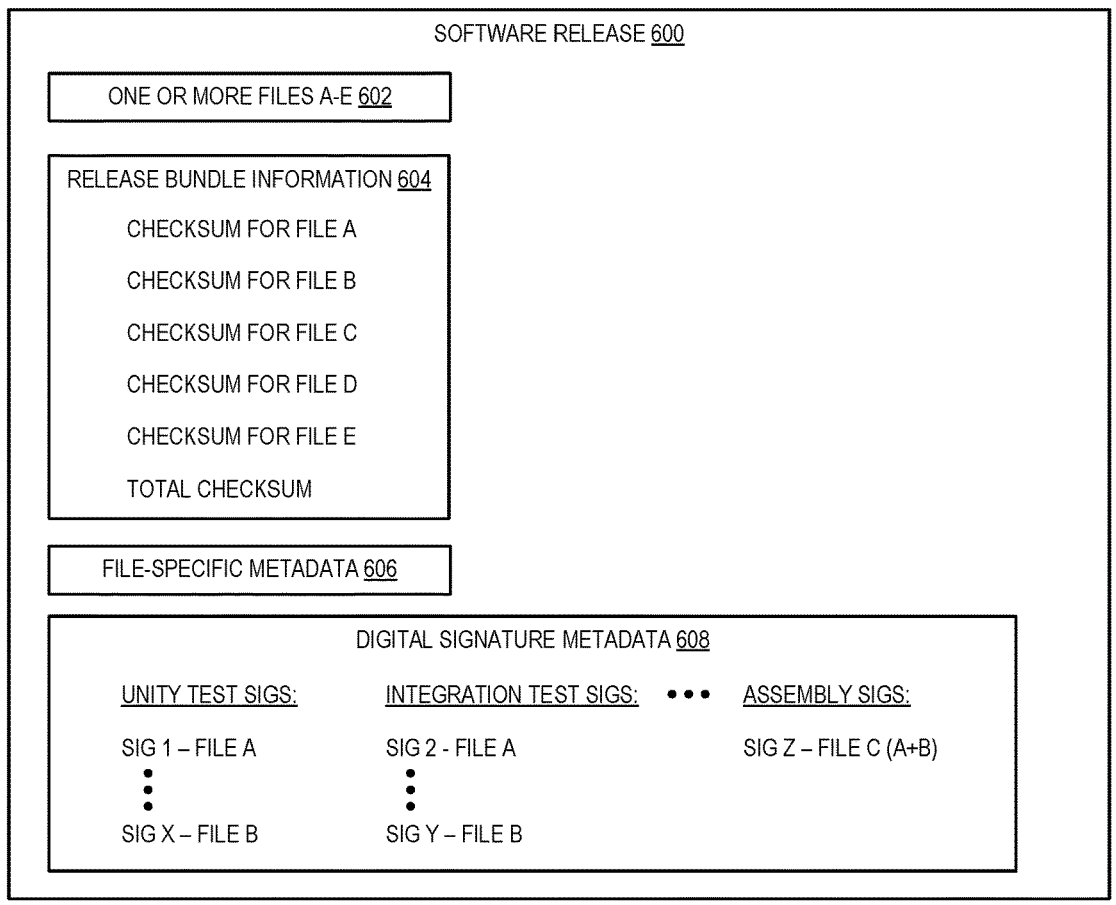
FIGS. 6A-6B are examples of software releases including digital signatures.
Figure 6B:
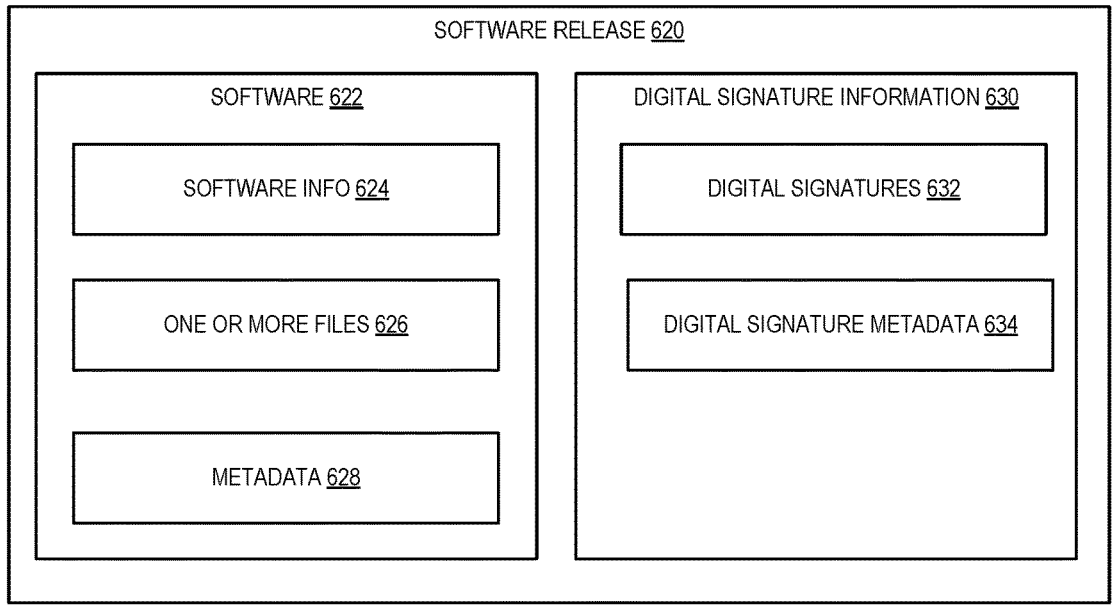

Referring to FIGS. 6A-6B, examples of software releases are shown. FIG. 6A illustrates a first example of a software release 600. FIG. 6B illustrates a second example of a software release 620

Referring to FIG. 6A, software release 600 includes one or more files 602. The one or more files 602 may include files A, B, C, D, and E. Software release 600 also includes release bundle information 604. Release bundle information 604 may include one or more checksums for files in software release 600. For example, release bundle information 604 may include a checksum for file A, a checksum for file B, a checksum for file C, a checksum for file D, and a checksum for file E, and a total checksum (e.g., a checksum for the entirety of files A-E). Software release 600 may also include file-specific metadata 606, such as file names, sizes, file paths, dates of storage, times of storage, or other information.

Software release 600 also includes digital signature metadata 608. Digital signature metadata 608 may include or correspond to digital signature information 332. In the example of FIG. 6, digital signature metadata 608 includes digital signatures and metadata associated with the digital signatures (not shown, such as digital signature metadata 512). For example, the digital signatures may include a set of digital signatures corresponding to a unity test (e.g., digital signature 1 corresponding to file A, and digital signature X corresponding to file B), digital signatures corresponding to an integration test (e.g., digital signature 2 corresponding to file A, and digital signature Y corresponding to file B), other digital signatures corresponding to other development stages, and digital signatures corresponding to an assembly stage (e.g., digital signature Z corresponding to file C (which is an assembled combination of files A and B). By storing the digital signatures in this fashion, the digital signatures may be searched by development stage (e.g., unity test, integration test, assembly, etc.) or by file that corresponds to the digital signature.

Referring to FIG. 6B, software release 620 includes software 622 and digital signature information 630. Software 622 includes software information 624, one or more files 626, and metadata 628. Software information 624 may include a list of files, checksums corresponding to the files, or other indications of files included in software 622. One or more files 626 includes one or more files of the software release (e.g., the software build). Metadata 628 includes information corresponding to the one or more files, to the software 622 as a whole, or both, such as file names, files sizes, times, dates, authors, software release names, versions, file paths, etc.

Digital signature information 630 includes digital signatures 632 and digital signature metadata 634. Digital signatures 632 include one or more digital signatures indicating successful completion of a corresponding development stage for one or more files 626. Digital signature metadata includes metadata associated with the digital signatures, such as authors, times, dates, development stages, build job numbers, checksums, other information, or any combination thereof. Digital signature metadata 634 may be used to identify which public key stored at a node device is to be used to decrypt a particular digital signature as part of verifying whether one or more files 626 have successfully completed multiple development stages of a development process.

Figure 7:
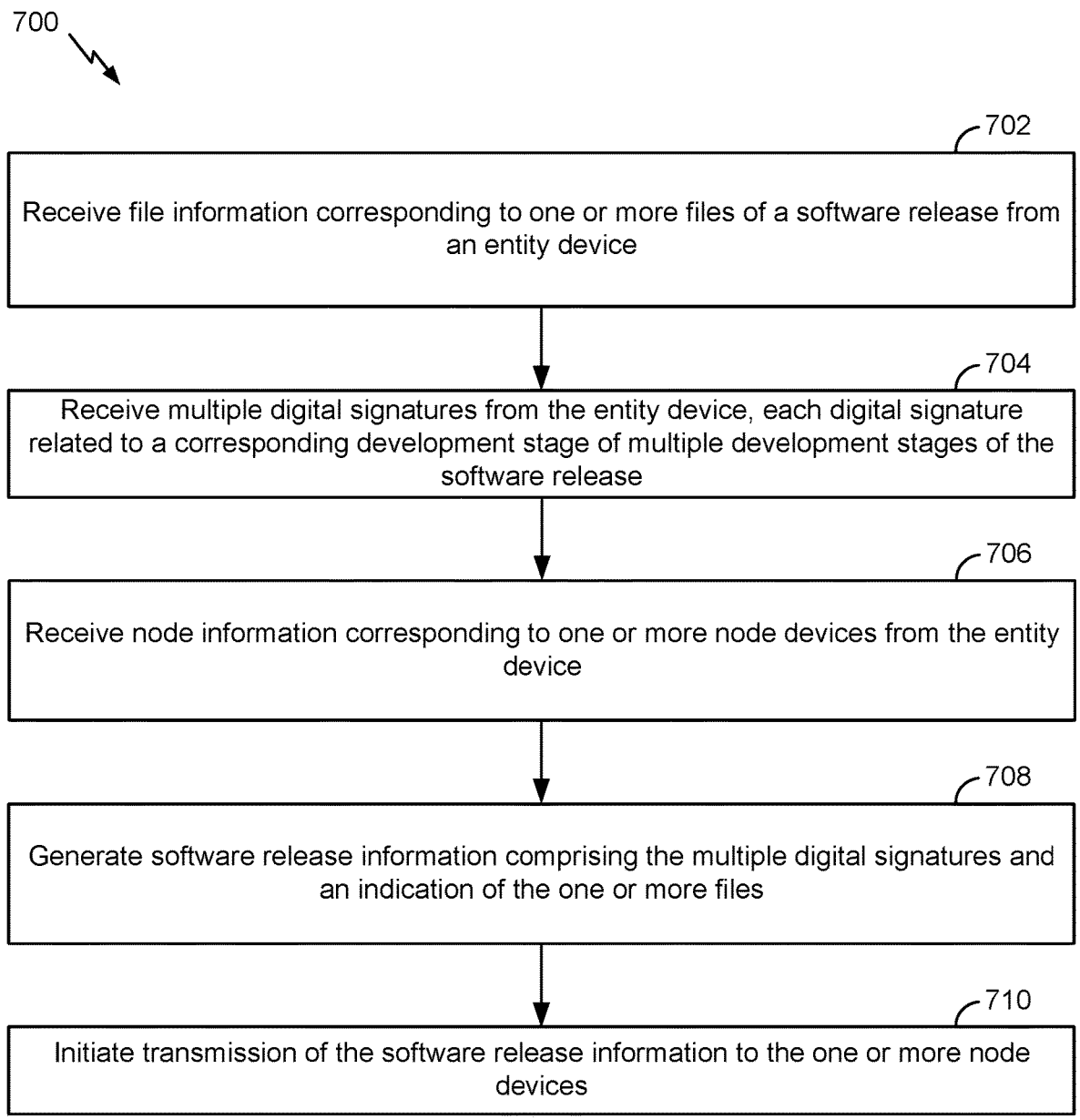
FIG. 7 is a flow diagram of an example of a method for sharing digital signature information of a software release.
Figure 8:
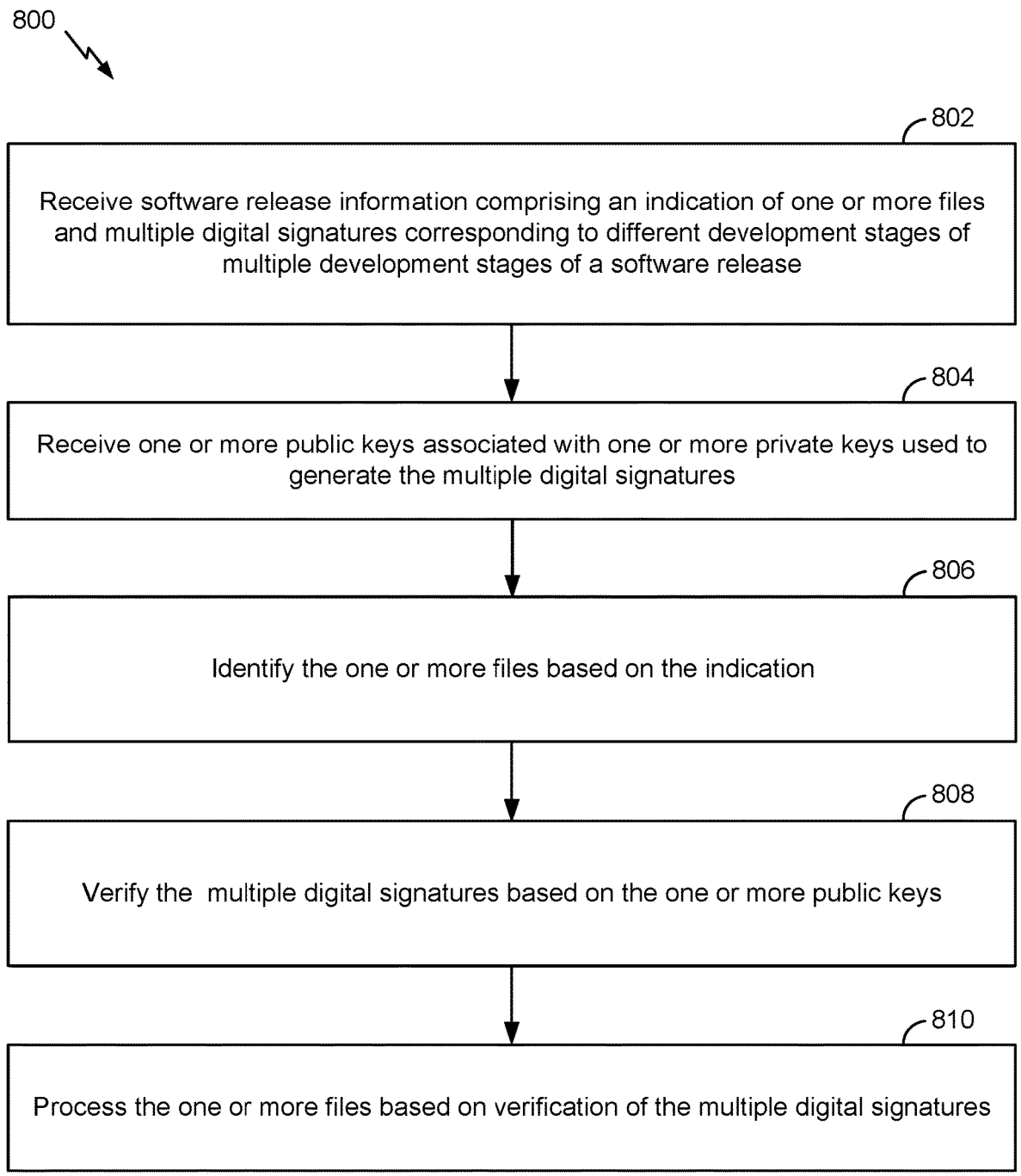
FIG. 8 is a flow diagram of an example of a method for verification of a deployed software release.
Figure 9:
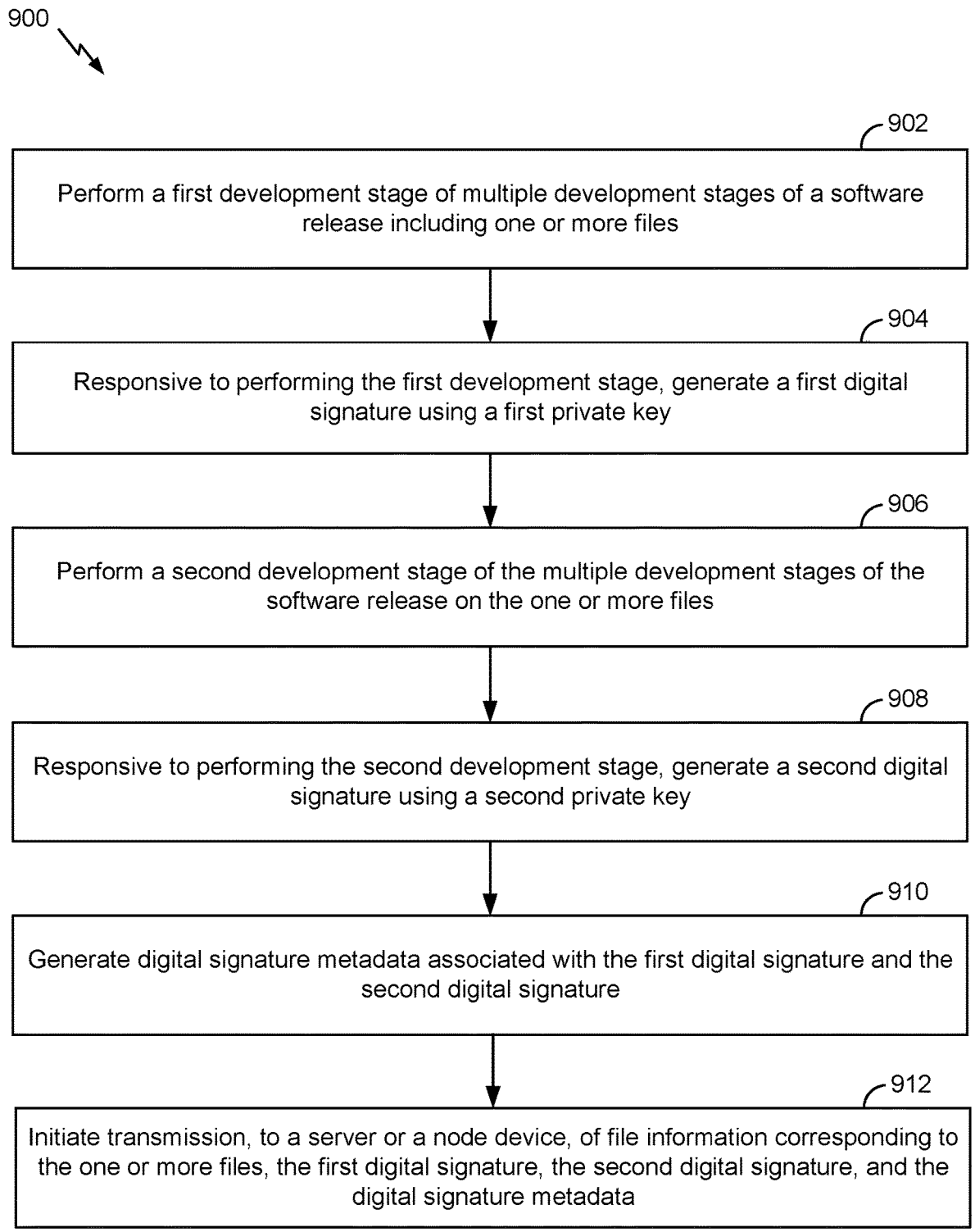
FIG. 9 is a flow diagram of an example of a method for generating digital signature information of a software release.

FIGS. 7-9 are flow diagrams of methods of sharing digital signature information and verifying a deployed software release. Each of the methods of FIGS. 7-9 may be stored in a computer-readable storage medium as instructions that, when executed by one or more processors, cause the one or more processors to perform the operations of the method (e.g., 700, 800, 900). In some such implementations, method(s) also includes generating one or more graphical user interfaces (GUIs) via which the first inquiry set is uploaded, the result of the modeling is displayed, the input to initiate mapping the response is received, or a combination thereof.

Referring to FIG. 7, a flow diagram of a method for sharing digital signature information according to an embodiment is shown as a method 700. In a particular implementation, method 700 may be performed by server 110, 168 (e.g., one or more processors 250, manager 252, and/or deployer 253), server 340, and/or server 404.

At 702, method 700 includes receiving file information corresponding to one or more files of a software release from an entity device. For example, server 340 may receive software information 330 from entity device 310. Software information 330 may include information corresponding to software 316.

At 704, method 700 includes receiving multiple digital signatures from the entity device. Each digital signature related to a corresponding development stage of multiple development stages of the software release. For example, server 340 may receive digital signature information 332 from entity device 310. Digital signature information 332 may include multiple digital signatures that correspond to development stages 320.

At 706, method 700 includes receiving node information corresponding to one or more node devices from the entity device. For example, server 340 may receive node information 333 from entity device 310.

At 708, method 700 includes generating software release information including the multiple digital signatures and an indication of the one or more files. For example, server 340 may generate software release 350 that includes software release information. In some implementations, the indication of the one or more files included in the software release information includes a checksum for at least one of the one or more files, a checksum for the entirety of the one or more files, or a combination thereof. At 710, method 700 includes initiating transmission of the software release information to each of the one or more node devices.

In a particular implementation, receiving the multiple digital signatures includes receiving a first digital signature corresponding to a first artifact and corresponding to a first development stage of the multiple development stages, and receiving a second digital signature corresponding to the first artifact and corresponding to a second development stage of the multiple development stages. For example, server 340 may receive first digital signature 326 that corresponds to first development stage 322 (and a first artifact) and second digital signature 328 that corresponds to second development stage 324 (and the first artifact). In some such implementations, receiving the multiple digital signatures further includes receiving a third digital signature corresponding to a second artifact and corresponding to the first development stage of the multiple development stages, receiving a fourth digital signature corresponding to the second artifact and corresponding to the second development stage of the multiple development stages, and receiving a fifth digital signature corresponding to the first artifact and the second artifact, and corresponding to a third development stage of the multiple development stages.

In a particular implementation, method 700 further includes receiving, for each digital signature of the multiple digital signatures, corresponding digital signature metadata. For example, digital signature information 332 may include digital signatures and metadata corresponding to each of the digital signatures. In some such implementations, for a particular digital signature of the multiple digital signatures, the corresponding digital signature metadata indicates an author of the particular digital signature, a development stage corresponding to the particular digital signature, a time corresponding to generation of the particular digital signature, a build job number corresponding to the particular digital signature, a checksum corresponding to the particular digital signature, or any combination thereof.

In a particular implementation, a first digital signature of the multiple digital signatures is generated using a first private key. For example, first digital signature 326 may be generated by a first private key (e.g., 440). In some such implementations, method 700 further includes receiving a first public key corresponding to the first private key. For example, server 340 may receive public keys 319 from entity device 310. Public keys 319 may include a first public key that corresponds to the first private key. In some such implementations, method 700 further includes initiating transmission of the first public key to the one or more node devices. For example, server 340 may initiate transmission of public keys 319 to node device 360. In some such implementations, a second digital signature of the multiple digital signatures is generated using a second private key, and method 700 further includes receiving a second public key corresponding to the second private key. For example, public keys 319 may also include a second public key that corresponds to a second private key (e.g., 444) that is used to generate second digital signature 328. In some such implementations, the first private key includes a first one-time use private key corresponding to a first development stage of the multiple development stages, and the second private key includes a second one-time use private key corresponding to a second development stage of the multiple development stages.

In some implementations, each of the multiple digital signatures corresponds to a different development stage of the multiple development stages. In other implementations, two or more of the multiple digital signatures correspond to the same development sate of the multiple development stages. In some such implementations, all of the multiple digital signatures correspond to a single development stage of the multiple development stages. In other implementations, a method for sharing digital signature information may include receiving at least one digital signature (e.g., one or more digital signatures) from the entity device, where each digital signature of the at least one digital signature is related to a corresponding development state of multiple development stages of a software release. In some implementations, software release information may be generated including the at least one digital signature and an indication of one or more files of the software release.

Thus, method 700 describes a method for sharing digital signatures and digital signature metadata between a server and a node device. Providing the digital signature data and digital signature metadata to the node device enables the node device to verify whether a software release has successfully completed multiple development stages of a development process, which may prevent the node device from processing software that is not fully developed or tested.

Referring FIG. 8, a flow diagram of a method for verification of a deployed software release according to an embodiment is shown as a method 800. In a particular implementation, method 800 may be performed by node device 160, 160a, 160b, 160c, 160d, node device 360, and/or node 406.

At 802, method 800 includes receiving software release information including an indication of one or more files and multiple digital signatures corresponding to different development stages of multiple development stages of a software release. For example, node device 360 may include software release 350 that includes an indication of one or more files and digital signature information 332 that includes multiple digital signatures.

At 804, method 800 includes receiving one or more public keys associated with one or more private keys used to generate the multiple digital signatures. For example, node device 360 may receive public keys 319 from server 340. Public keys 319 may include public keys that correspond to private keys used to generate the digital signatures.

At 806, method 800 includes identifying the one of more files based on the indication. For example, software 352 (e.g., one or more files) may be received from server 340 or may be identified as residing in a memory of node device 360.

At 808, method 800 includes verifying the multiple digital signatures based on the one or more public keys. For example, node device 360 may use public keys 319 to verify the digital signatures included in digital signature information 332. At 810, method 800 includes processing the one or more files based on verification of the multiple digital signatures.

In a particular implementation, the software release information further includes digital signature metadata associated with the multiple digital signatures. For example, digital signature information 332 includes metadata corresponding to each of the included digital signatures. In some such implementations, for a particular digital signature of the multiple digital signatures, the digital signature metadata indicates an author of the particular digital signature, a development stage corresponding to the particular digital signature, a time corresponding to generation of the particular digital signature, a build job number corresponding to the particular digital signature, a checksum corresponding to the particular digital signature, or any combination thereof. In some such implementations, method 800 further includes identifying, based on the digital signature metadata, a first public key of the one or more public keys that corresponds to a first digital signature of the multiple digital signatures. For example, node device 360 identifies a first public key of public keys 319 based on a similarity between the first public key and a first digital signature (as indicated by the corresponding digital signature metadata). In some such implementations, the first public key corresponds to a first author, and the digital signature metadata indicates that the first digital signature corresponds to the first author.

In a particular implementation, receiving the multiple digital signatures includes receiving a first digital signature of the multiple digital signatures and receiving a second digital signature of the multiple digital signatures. The first digital signature corresponds to a first development stage of the multiple development stages and the second digital signature corresponds to a second development stage of the multiple development stages. For example, digital signature information 332 includes first digital signature 326 (corresponding to first development stage 322) and second digital signature 328 (corresponding to second development stage 324).

In a particular implementation, processing the one or more files includes loading the one or more files to a memory responsive to verifying that the one or more files have completed the multiple development stages and setting a flag corresponding to the one or more files to indicate that the one or more files have completed the multiple development stages. For example, software 352 may be loaded from transaction directory 370 into memory 364 and verification flag 366 may be set. In some such implementations, processing the one or more files further includes executing the one or more files and initiating transmission of a notification indicating that the one or more files are accepted.

In a particular implementation, processing the one or more files includes discarding the one or more files responsive to a failure to verify that the one or more files have completed the multiple development stages. For example, software 352 may be discarded (e.g., deleted) from transaction directory 370. In some such implementations, method 800 further include initiating transmission of a notification indicating that the one or more files are rejected.

Thus, method 800 describes a method for using digital signature data and digital signature metadata at a node device to verify whether a software release has successfully completed multiple development stages of a development process, which may prevent the node device from processing software that is not fully developed or tested, thereby preventing the node device from being exposed to vulnerabilities corresponding to the not fully developed software.

Referring FIG. 9, a flow diagram of a method for generating digital signature information of a software release according to an embodiment is shown as a method 900. In a particular implementation, method 900 may be performed by entity server 140, entity 150, 150a, 150b, entity device 310, and/or entity 402.

At 902, method 900 includes performing a first development stage of multiple development stages of a software release including one or more files. For example, first development stage 322 of development stages 320 may be performed on software 316.

At 904, method 900 includes, responsive to performing the first development stage, generating a first digital signature using a first private key. For example, first digital signature 326 may be generated using a first private key (e.g., 440).

At 906, method 900 includes performing a second development stage of the multiple development stages of the software release on the one or more files. For example, second development stage 324 of development stages 320 may be performed on software 316. In some implementations, the second development stage may be a final development stage of multiple development stages.

At 908, method 900 includes, responsive to performing the second development stage, generating a second digital signature using a second private key. For example, second digital signature 328 may be generated using a second private key (e.g., 444).

At 910, method 900 includes generating digital signature metadata associated with the first digital signature and the second digital signature. For example, entity device 310 may generate digital signature information 332 that includes the digital signatures and metadata corresponding to the digital signatures.

At 912, method 900 further includes initiating transmission, to a server or a node device, of file information corresponding to the one or more files, the first digital signature, the second digital signature, and the digital signature metadata. For example, digital signature information 332 (including the first digital signature and the second digital signature) is transmitted from entity device 310 to server 340 or node device 360.

In other implementations, only the first digital signature is transmitted, and a second digital signature is not generated or is not transmitted. The first digital signature may correspond to an initial development stage, an intermediate development stage, or a final development stage. At a later time, a second digital signature may optionally be generated and transmitted from entity device 310 to server 340 or to node 360.

Thus, method 900 describes a method for generating digital signatures and digital signature metadata. The digital signature data and digital signature metadata enables a node device to verify whether a software release has successfully completed multiple development stages of a development process, which may prevent the node device from processing software that is not fully developed or tested.

In some implementations, methods 700, 800, and/or 900 can be combined such that one or more operations described with reference to one of the methods of FIGS. 7-9 may be combined with one or more operations of another of FIGS. 7-9. For example, one or more operations of method 700 may be combined with one or more operations of method 800. As another example, one or more operations of method 800 may be combined with one or more operations of method 900.

In some aspects, techniques for supporting sharing of digital signature information of a software release may include additional aspects, such as any single aspect or any combination of aspects described below or in connection with one or more other processes or devices described elsewhere herein. In some aspects, supporting sharing of digital signature information of a software release may include a system configured to receive file information corresponding to one or more files of a software release from an entity device, and receive multiple digital signatures from the entity device. Each digital signature is related to a corresponding development stage of multiple development stages of the software release. The system is also configured receive node information corresponding to one or more node devices from the entity device, and generate software release information including the multiple digital signatures and an indication of the one or more files. The system is further configured to initiate transmission of the software release information to the one or more node devices. In some implementations, the system includes one or more devices, one or more processors, one or more package modules, or a combination thereof. For example, one or more operations described with reference to the system may be performed by the one or more devices, the one or more processors, the one or more package modules, or the combination thereof. In some implementations, the system may include at least one processor, and a memory coupled to the processor. The processor may be configured to perform operations described herein with respect to the system. In some other implementations, the system may include a non-transitory computer-readable medium having program code recorded thereon and the program code may be executable by a computer for causing the computer to perform operations described herein with reference to the system. In some implementations, the system may include one or more means configured to perform operations described herein. In some implementations, a method of a repository supporting multiple package types may include one or more operations described herein with reference to the system.

In a first aspect, to receive the multiple digital signatures the system is further configured to receive a first digital signature corresponding to a first artifact and corresponding to a first development stage of the multiple development stages.

In a second aspect, in combination with the first aspect, to receive the multiple digital signatures, the system is further configured to receive a second digital signature corresponding to the first artifact and corresponding to a second development stage of the multiple development stages.

In a third aspect, in combination with the second aspect, to receive the multiple digital signatures, the system is further configured to receive a third digital signature corresponding to a second artifact and corresponding to the first development stage of the multiple development stages.

In a fourth aspect, in combination with the third aspect, to receive the multiple digital signatures, the system is further configured to receive a fourth digital signature corresponding to the second artifact and corresponding to the second development stage of the multiple development stages.

In a fifth aspect, in combination with the fourth aspect, to receive the multiple digital signatures, the system is further configured to receive a fifth digital signature corresponding to the first artifact and the second artifact, and corresponding to a third development stage of the multiple development stages.

In a sixth aspect, alone or in combination with one or more of the first through fifth aspects, the system is further configured to receive, for each digital signature of the multiple digital signatures, corresponding digital signature metadata.

In a seventh aspect, in combination with the sixth aspect, for a particular digital signature of the multiple digital signatures, the corresponding digital signature metadata indicates an author of the particular digital signature, a development stage corresponding to the particular digital signature, a time corresponding to generation of the particular digital signature, a build job number corresponding to the particular digital signature, a checksum corresponding to the particular digital signature, or any combination thereof.

In an eighth aspect, alone or in combination with one or more of the first through seventh aspects, a first digital signature of the multiple digital signatures is generated using a first private key.

In a ninth aspect, in combination with the eighth aspect, the system is further configured to receive a first public key corresponding to the first private key.

In a tenth aspect, in combination with the ninth aspect, the system is further configured to initiate transmission of the first public key to the one or more node devices.

In an eleventh aspect, in combination with the tenth aspect, a second digital signature of the multiple digital signatures is generated using a second private key.

In a twelfth aspect, in combination with the eleventh aspect, the system is further configured to receive a second public key corresponding to the second private key.

In a thirteenth aspect, in combination with the twelfth aspect, the first private key includes a first one-time use private key corresponding to a first development stage of the multiple development stages.

In a fourteenth aspect, in combination with the thirteenth aspect, the second private key includes a second one-time use private key corresponding to a second development stage of the multiple development stages.

In a fifteenth aspect, alone or in combination with one or more of the first through fourteenth aspects, the indication of the one or more files included in the software release information includes a checksum for at least one of the one or more files, a checksum for the entirety of the one or more files, or a combination thereof.

In a sixteenth aspect, in combination with the fifteenth aspect, the multiple digital signatures are generated using one or more private keys.

In a seventeenth aspect, in combination with the sixteenth aspect, the system is further configured to receive one or more public keys that correspond to the one or more private keys.

In an eighteenth aspect, in combination with the seventeenth aspect, the system is further configured to initiate transmission of the one or more public keys to the one or more node devices.

In a nineteenth aspect, alone or in combination with one or more of the first through eighteenth aspects, each digital signature of the multiple digital signatures corresponds to a software build job.

In a twentieth aspect, in combination with the nineteenth aspect, the system is further configured to maintain a ledger of digital signatures.

In a twenty-first aspect, in combination with the twentieth aspect, the ledger includes the multiple digital signatures and digital signature metadata corresponding to the multiple digital signatures.

In some aspects, techniques for supporting verification of a deployed software release may include additional aspects, such as any single aspect or any combination of aspects described below or in connection with one or more other processes or devices described elsewhere herein. In some aspects, supporting verification of a deployed software release may include a system configured to receive software release information including an indication of one or more files and multiple digital signatures corresponding to different development stages of multiple development stages of a software release. The system is also configured to receive one or more public keys associated with one or more private keys used to generate the multiple digital signatures, and identify the one or more files based on the indication. The system is further configured to verify the multiple digital signatures based on the one or more public keys, and process the one or more files based on verification of the multiple digital signatures. In some implementations, the system includes one or more devices, one or more processors, one or more package modules, or a combination thereof. For example, one or more operations described with reference to the system may be performed by the one or more devices, the one or more processors, the one or more package modules, or the combination thereof. In some implementations, the system may include at least one processor, and a memory coupled to the processor. The processor may be configured to perform operations described herein with respect to the system. In some other implementations, the system may include a non-transitory computer-readable medium having program code recorded thereon and the program code may be executable by a computer for causing the computer to perform operations described herein with reference to the system. In some implementations, the system may include one or more means configured to perform operations described herein. In some implementations, a method of a repository supporting multiple package types may include one or more operations described herein with reference to the system.

In a twenty-second aspect, the software release information further includes digital signature metadata associated with the multiple digital signatures.

In a twenty-third aspect, in combination with the twenty-second aspect, for a particular digital signature of the multiple digital signatures, the digital signature metadata indicates an author of the particular digital signature, a development stage corresponding to the particular digital signature, a time corresponding to generation of the particular digital signature, a build job number corresponding to the particular digital signature, a checksum corresponding to the particular digital signature, or any combination thereof.

In a twenty-fourth aspect, in combination with the twenty-third aspect, the system is further configured to identify, based on the digital signature metadata, a first public key of the one or more public keys that corresponds to a first digital signature of the multiple digital signatures.

In a twenty-fifth aspect, in combination with the twenty-fourth aspect, the first public key corresponds to a first author.

In a twenty-sixth aspect, in combination with the twenty-fifth aspect, the digital signature metadata indicates that the first digital signature corresponds to the first author.

In a twenty-seventh aspect, in combination with one or more of the twenty-second through twenty-sixth aspects, to receive the multiple digital signatures, the system is further configured to receive a first digital signature of the multiple digital signatures. The first digital signature corresponds to a first development stage of the multiple development stages.

In a twenty-eighth aspect, in combination with the twenty-seventh aspect, to receive the multiple digital signatures, the system is further configured to receive a second digital signature of the multiple digital signatures. The second digital signature corresponds to a second development stage of the multiple development stages.

In a twenty-ninth aspect, alone or in combination with one or more of the twenty-second through twenty-eighth aspects, to process the one or more files, the system is further configured to load the one or more files to a memory responsive to verifying that the one or more files have completed the multiple development stages.

In a thirtieth aspect, in combination with the twenty-ninth aspect, to process the one or more files, the system is further configured to set a flag corresponding to the one or more files to indicate that the one or more files have completed the multiple development stages.

In a thirty-first aspect, in combination with the thirtieth aspect, to process the one or more files, the system is further configured to execute the one or more files.

In a thirty-second aspect, in combination with the thirty-first aspect, to process the one or more files, the system is further configured to initiate transmission of a notification indicating that the one or more files are accepted.

In a thirty-third aspect, alone or in combination with one or more of the twenty-second through thirty-second aspects, to process the one or more files, the system is further configured to discard the one or more files responsive to a failure to verify that the one or more files have completed the multiple development stages.

In a thirty-fourth aspect, in combination with the thirty-fourth aspect, the system is further configured to initiate transmission of a notification that indicates the one or more files are rejected.

In a thirty-fifth aspect, alone or in combination with one or more of the twenty-second through thirty-third aspects, the system is further configured to identify a first public key of the one or more public keys that corresponds to a first digital signature of the multiple digital signatures based on an author of the first digital signature and an author associated with the first public key.

In a thirty-sixth aspect, alone or in combination with one or more of the twenty-second through thirty-fifth aspects, to verify that the one or more files have completed the multiple development stages, the system is further configured to decrypt the multiple digital signatures using the one or more public keys.

In a thirty-seventh aspect, alone or in combination with one or more of the twenty-second through thirty-sixth aspects, the software release information is received from an artifact repository server.

In a thirty-eighth aspect, alone or in combination with one or more of the twenty-second through thirty-sixth aspects, the software release information is received from an entity device.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for sharing digital signature information of a software release, the method comprising:
   receiving, by one or more processors, file information corresponding to one or more files of a software release from an entity device;
   receiving, by the one or more processors, multiple digital signatures from the entity device, each digital signature related to a corresponding development stage of multiple development stages of the software release;
   receiving, by the one or more processors, node information corresponding to one or more node devices from the entity device;
   generating, by the one or more processors, software release information comprising the multiple digital signatures and an indication of the one or more files; and
   initiating, by the one or more processors, transmission of the software release information to the one or more node devices.

2. The method of claim 1, where receiving the multiple digital signatures comprises:
   receiving a first digital signature corresponding to a first artifact and corresponding to a first development stage of the multiple development stages; and
   receiving a second digital signature corresponding to the first artifact and corresponding to a second development stage of the multiple development stages.

3. The method of claim 2, where receiving the multiple digital signatures further comprises:
   receiving a third digital signature corresponding to a second artifact and corresponding to the first development stage of the multiple development stages;
   receiving a fourth digital signature corresponding to the second artifact and corresponding to the second development stage of the multiple development stages; and
   receiving a fifth digital signature corresponding to the first artifact and the second artifact, and corresponding to a third development stage of the multiple development stages.

4. The method of claim 1, further comprising receiving, by the one or more processors, for each digital signature of the multiple digital signatures, corresponding digital signature metadata.

5. The method of claim 4, where, for a particular digital signature of the multiple digital signatures, the corresponding digital signature metadata indicates an author of the particular digital signature, a development stage corresponding to the particular digital signature, a time corresponding to generation of the particular digital signature, a build job number corresponding to the particular digital signature, a checksum corresponding to the particular digital signature, or any combination thereof.

6. The method of claim 1, where a first digital signature of the multiple digital signatures is generated using a first private key.

7. The method of claim 6, further comprising receiving, by the one or more processors, a first public key corresponding to the first private key.

8. The method of claim 7, further comprising initiating transmission of the first public key to the one or more node devices.

9. The method of claim 8, where a second digital signature of the multiple digital signatures is generated using a second private key, and further comprising receiving, by the one or more processors, a second public key corresponding to the second private key.

10. The method of claim 9, where:
the first private key comprises a first one-time use private key corresponding to a first development stage of the multiple development stages; and
the second private key comprises a second one-time use private key corresponding to a second development stage of the multiple development stages.

11. The method of claim 1, where the indication of the one or more files included in the software release information comprises a checksum for at least one of the one or more files, a checksum for the entirety of the one or more files, or a combination thereof.

12. A system for sharing digital signature information of a software release, the system comprising:
at least one memory storing instructions; and
one or more processors coupled to the at least one memory, the one or more processors configured to execute the instructions to cause the one or more processors to:
receive, from an entity device, file information corresponding to one or more files of a software release;
receive multiple digital signatures from the entity device, each digital signature corresponding to a different development stage of multiple development stages of the software release;
receive node information corresponding to one or more node devices to receive the software release;
generate software release information comprising the digital signatures and an indication of the one or more files; and
initiate transmission of the software release information to the one or more node devices.

13. The system of claim 12, where:
the multiple digital signatures are generated using one or more private keys;
the one or more processors are further configured to:
receive one or more public keys that correspond to the one or more private keys; and
initiate transmission of the one or more public keys to the one or more node devices.

14. The system of claim 12, where each digital signature of the multiple digital signatures corresponds to a software build job.

15. The system of claim 12, where the one or more processors are further configured to maintain a ledger of digital signatures, the ledger including the multiple digital signatures and digital signature metadata corresponding to the multiple digital signatures.

16. The system of claim 12, further comprising:
a first device comprising the at least one memory and the one or more processors; and
a second device comprising:
at least one second memory storing second instructions; and
one or more second processors coupled to the at least one second memory, the one or more second processors configured to execute the second instructions to cause the one or more second processors to:
receive the software release information comprising the indication of the one or more files and the multiple digital signatures;
receive one or more public keys associated with one or more private keys used to generate the multiple digital signatures;
identify the one or more files based on the indication;
verify the multiple digital signatures based on the one or more public keys; and
process the one or more files based on verification of the multiple digital signatures.

17. The system of claim 16, where the software release information further includes digital signature metadata associated with the multiple digital signatures.

18. The system of claim 17, where, for a particular digital signature of the multiple digital signatures, the digital signature metadata indicates an author of the particular digital signature, a development stage corresponding to the particular digital signature, a time corresponding to generation of the particular digital signature, a build job number corresponding to the particular digital signature, a checksum corresponding to the particular digital signature, or any combination thereof.

19. The system of claim 17, where the one or more second processors are further configured to execute the second instructions to cause the one or more second processors to identify, based on the digital signature metadata, a first public key of the one or more public keys that corresponds to a first digital signature of the multiple digital signatures.

20. The system of claim 19, where:
the first public key corresponds to a first author; and
the digital signature metadata indicates that the first digital signature corresponds to the first author.

21. The system of claim 16, where, to receive the multiple digital signatures, the one or more second processors are further configured to execute the second instructions to cause the one or more second processors to:
receive a first digital signature of the multiple digital signatures, the first digital signature corresponding to a first development stage of the multiple development stages; and
receive a second digital signature of the multiple digital signatures, the second digital signature corresponding to a second development stage of the multiple development stages.

22. The system of claim 16, where, to process the one or more files, the one or more second processors are further configured to execute the second instructions to cause the one or more second processors to:
load the one or more files to a memory responsive to verifying that the one or more files have completed the multiple development stages; and
set a flag corresponding to the one or more files to indicate that the one or more files have completed the multiple development stages.

23. The system of claim 22, where, to process the one or more files, the one or more second processors are further configured to execute the second instructions to cause the one or more second processors to:
  execute the one or more files; and
  initiate transmission of a notification indicating that the one or more files are accepted.

24. The system of claim 16, where, to process the one or more files, the one or more second processors are further configured to execute the second instructions to cause the one or more second processors to discard the one or more files responsive to a failure to verify that the one or more files have completed the multiple development stages.

25. The system of claim 24, where the one or more second processors are further configured to execute the second instructions to cause the one or more second processors to initiate transmission of a notification indicating that the one or more files are rejected.

26. The system of claim 16, where the one or more second processors are further configured to execute the second instructions to cause the one or more second processors to identify a first public key of the one or more public keys that corresponds to a first digital signature of the multiple digital signatures based on an author of the first digital signature and an author associated with the first public key.

27. The system of claim 16, where, to verify that the one or more files have completed the multiple development stages, the one or more second processors are further configured to execute the second instructions to cause the one or more second processors to decrypt the multiple digital signatures using the one or more public keys.

28. The system of claim 16, where the software release information is received from an artifact repository server or a second entity device.

29. A non-transitory computer-readable medium storing instructions that, when executed by a processor, cause the processor to perform operations comprising:
  receiving, from an entity device, file information corresponding to one or more files of a software release;
  receiving multiple digital signatures from the entity device, each digital signature corresponding to a different development stage of multiple development stages of the software release;
  receiving node information corresponding to one or more node devices to receive the software release;
  generating software release information comprising the digital signatures and an indication of the one or more files; and
  initiating transmission of the software release information to the one or more node devices.

* * * * *